(12) United States Patent  (10) Patent No.: US 9,395,763 B2
Cho et al.  (45) Date of Patent: Jul. 19, 2016

(54) MOBILE TERMINAL AND CONTROLLING METHOD THEREOF

(75) Inventors: Seong Yoon Cho, Seoul (KR); Young Wun Kim, Anyang-si (KR); Hoi Chul Kim, Seoul (KR); Je Kwang Youn, Seoul (KR); Young Jung Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 12/751,138

(22) Filed: Mar. 31, 2010

(65) Prior Publication Data

US 2010/0251152 A1   Sep. 30, 2010

Related U.S. Application Data

(60) Provisional application No. 61/165,506, filed on Mar. 31, 2009.

(30) Foreign Application Priority Data

Mar. 31, 2009   (KR) .................... 10-2009-0027821

(51) Int. Cl.
*G06F 3/0488* (2013.01)
*G06F 3/0482* (2013.01)
*G06F 3/0481* (2013.01)
(Continued)

(52) U.S. Cl.
CPC ............... *G06F 1/169* (2013.01); *G06F 1/165* (2013.01); *G06F 1/1626* (2013.01); *G06F 3/03547* (2013.01); *G06F 3/0481* (2013.01); *G06F 3/0482* (2013.01); *G06F 3/0485* (2013.01); *G06F 3/0486* (2013.01); *G06F 2203/0339* (2013.01); *G06F 2203/04806* (2013.01)

(58) Field of Classification Search
CPC .. G06F 3/04883; G06F 3/0482; G06F 3/0488
USPC .................. 715/765, 810, 863; 345/169, 173
See application file for complete search history.

(56) References Cited

U.S. PATENT DOCUMENTS 6,144,358 A * 11/2000 Narayanaswamy et al. .. 345/102
6,252,563 B1 * 6/2001 Tada et al. ...................... 345/1.1
(Continued)

FOREIGN PATENT DOCUMENTS

CN      101068422      11/2007
EP      2 040 154 A2    3/2009
(Continued)

OTHER PUBLICATIONS

Kivikangas, et al., Future Mobile Phone User Interfaces: A Survey, Nov. 1, 2006, Proceedings of the IADIS International Conference on WWW/Internet, p. 98-103.*
(Continued)

*Primary Examiner* — Jordany Nunez
(74) *Attorney, Agent, or Firm* — KED & Associates LLP

(57) ABSTRACT

A mobile terminal and as associated method are provided. The method may include displaying one or more menu items on a first touch unit including a touchscreen and recognizing a rotary touch & drag input at a second touch unit as a particular command based on whether one of the one or more menu items has been touched. Accordingly, even if a minimum number of menu icons for executing diverse functions are displayed on a touchscreen, a prescribed one of the diverse functions may be easily selected and executed.

11 Claims, 44 Drawing Sheets

(51) Int. Cl.
*G06F 7/00* (2006.01)
*G06F 1/16* (2006.01)
*G06F 3/0354* (2013.01)
*G06F 3/0485* (2013.01)
*G06F 3/0486* (2013.01)

(56) References Cited

U.S. PATENT DOCUMENTS

| | | | |
|---|---|---|---|
| 6,466,202 B1 * | 10/2002 | Suso et al. | 345/169 |
| 7,187,364 B2 * | 3/2007 | Duarte et al. | 345/168 |
| 2003/0076301 A1 * | 4/2003 | Tsuk et al. | 345/159 |
| 2003/0222913 A1 * | 12/2003 | Mattila et al. | 345/764 |
| 2003/0234768 A1 * | 12/2003 | Rekimoto et al. | 345/169 |
| 2004/0021681 A1 | 2/2004 | Liao | 345/702 |
| 2005/0248540 A1 * | 11/2005 | Newton | 345/173 |
| 2007/0252729 A1 * | 11/2007 | Li et al. | 341/22 |
| 2007/0263014 A1 | 11/2007 | Ketola et al. | 345/684 |
| 2007/0271528 A1 * | 11/2007 | Park et al. | 715/810 |
| 2008/0204424 A1 | 8/2008 | Jin et al. | |
| 2008/0207273 A1 * | 8/2008 | Huo | 455/566 |
| 2008/0231601 A1 | 9/2008 | Fyke et al. | 345/167 |
| 2008/0244447 A1 * | 10/2008 | Sagar | 715/810 |
| 2008/0270899 A1 * | 10/2008 | Duncan | 715/700 |
| 2010/0083190 A1 * | 4/2010 | Roberts et al. | 715/863 |

FOREIGN PATENT DOCUMENTS

| | | |
|---|---|---|
| JP | 2003-330611 A | 11/2003 |
| WO | WO 01/71518 A1 | 9/2001 |

OTHER PUBLICATIONS

Chinese Office Action issued in CN Appln No. 2010-10155021 dated Sep. 24, 2012. (full Chiense text and full English translation).
European Search Report dated Nov. 4, 2014 issued in Application No. 10 00 3475.

* cited by examiner

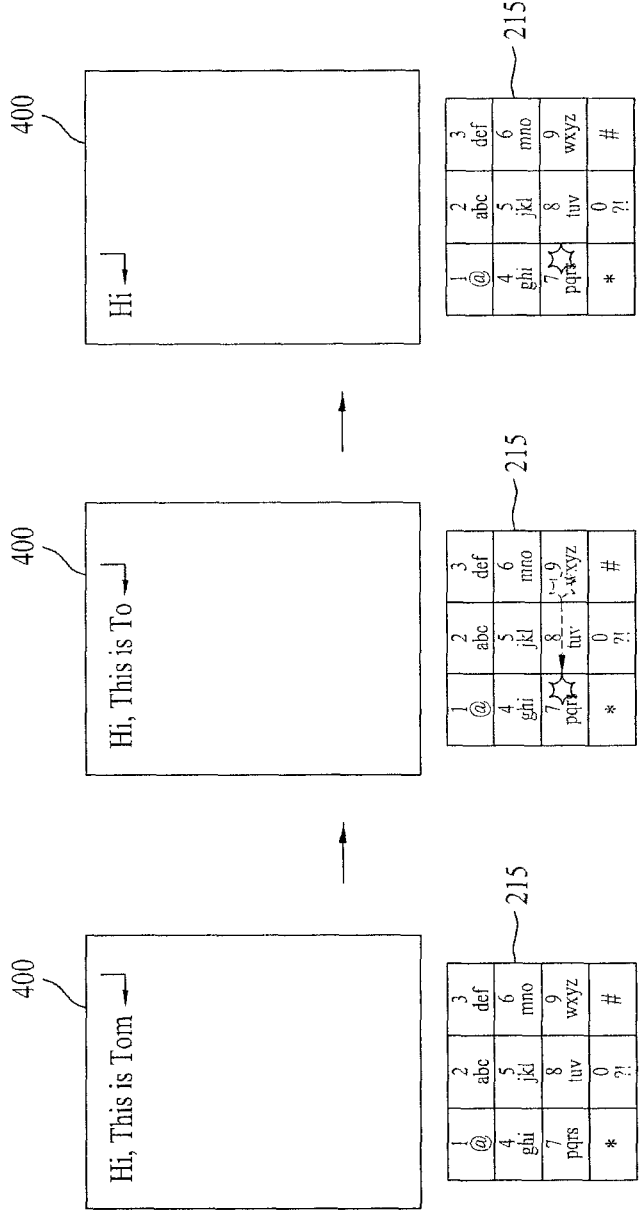

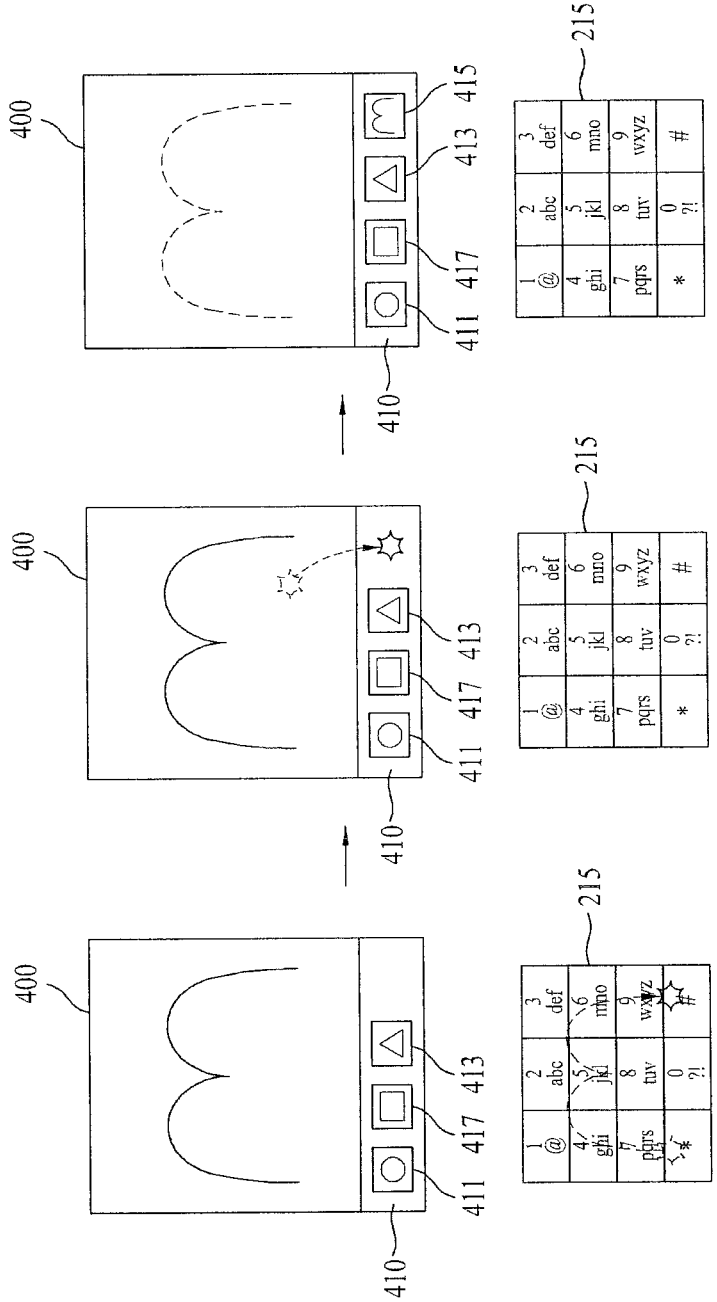

FIG. 19A
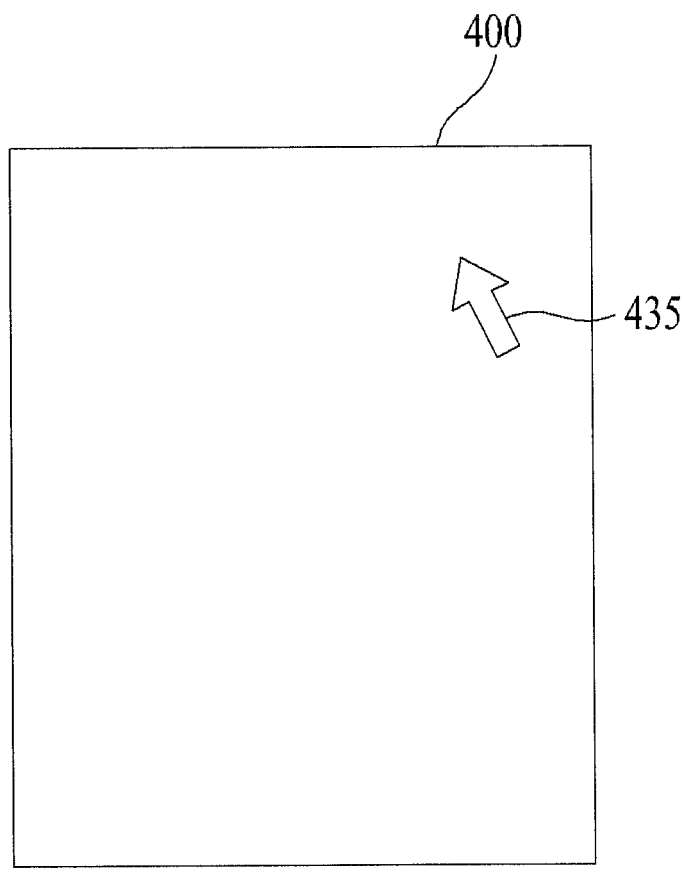
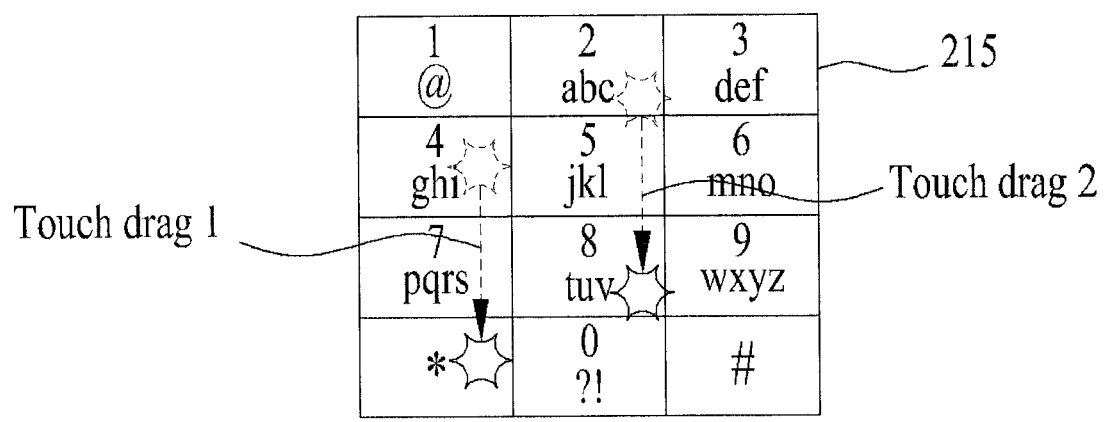

$V_2 > V_1$
$L_3 > L_2$

FIG. 21A
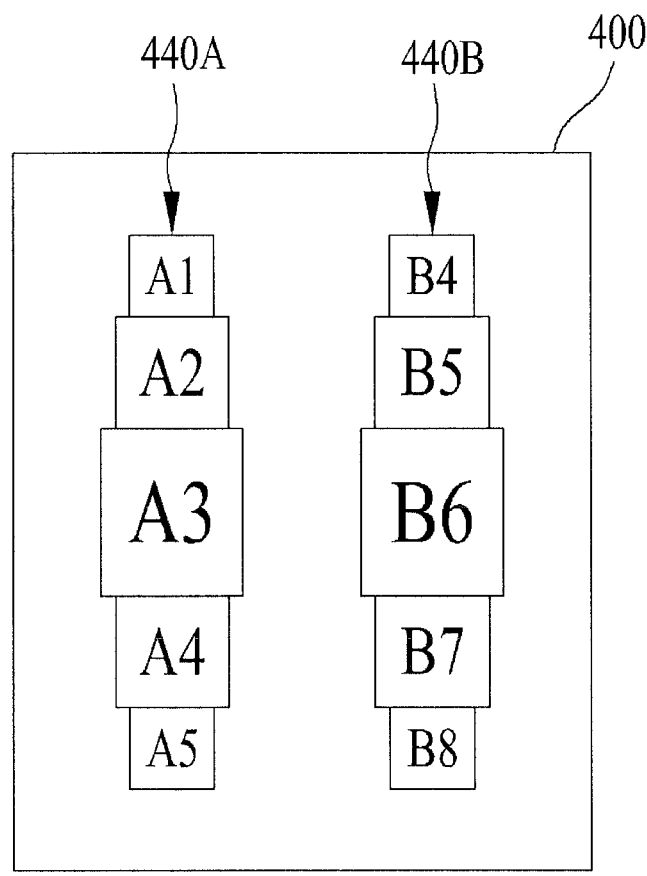
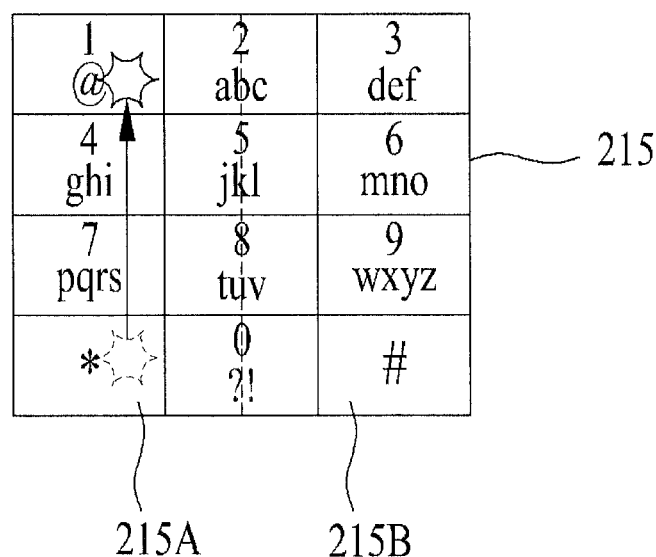

FIG. 21B
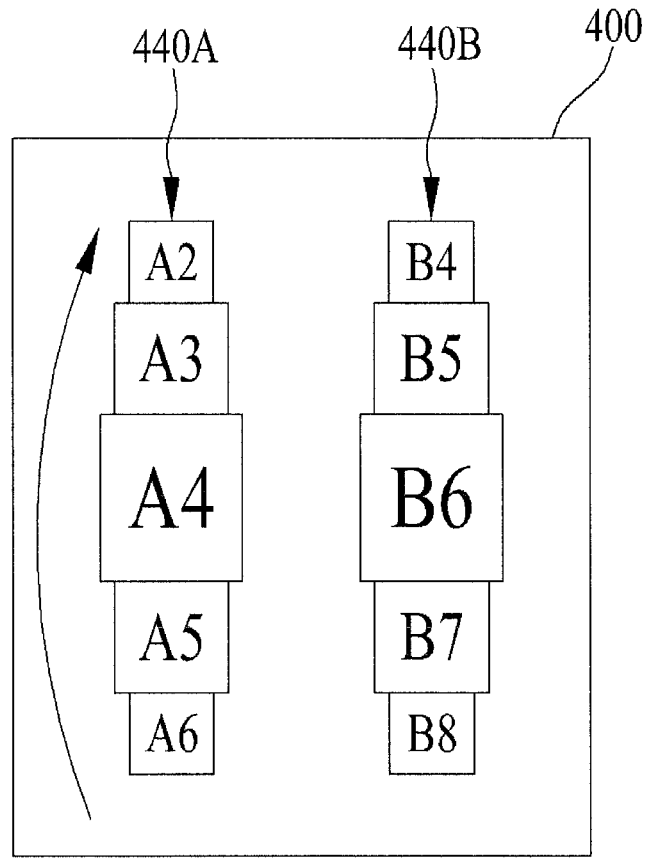
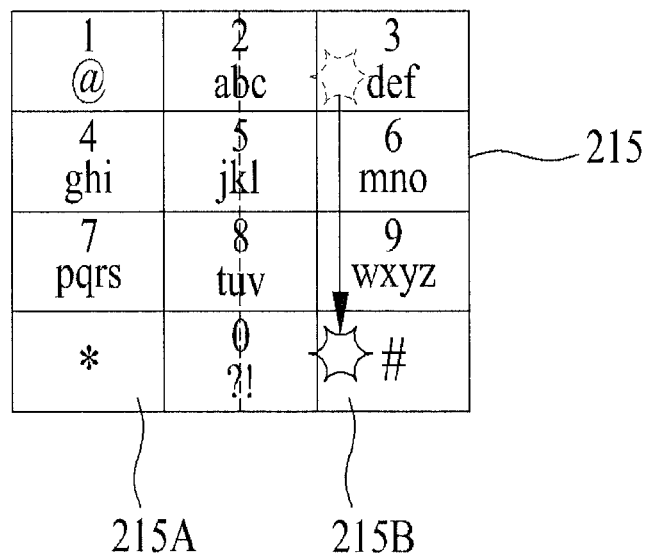

FIG. 23A
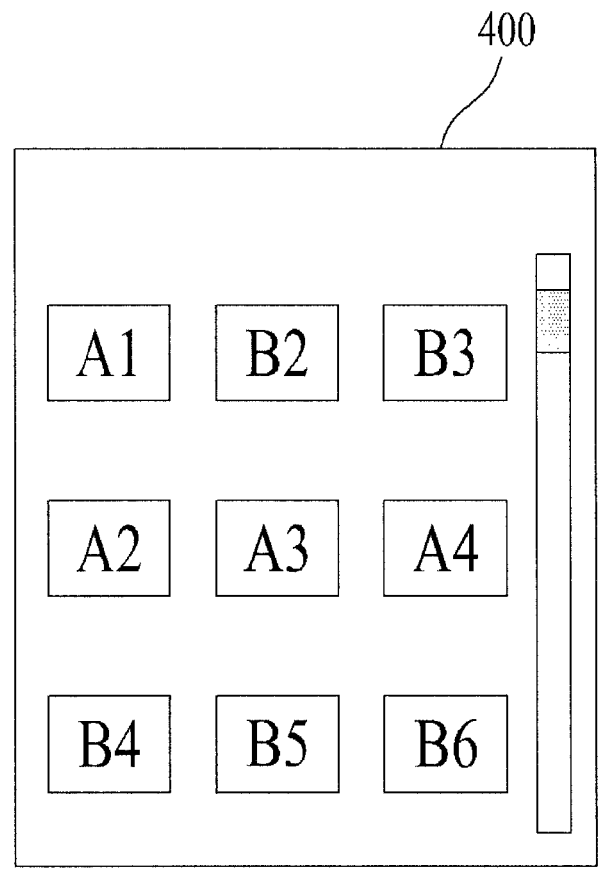
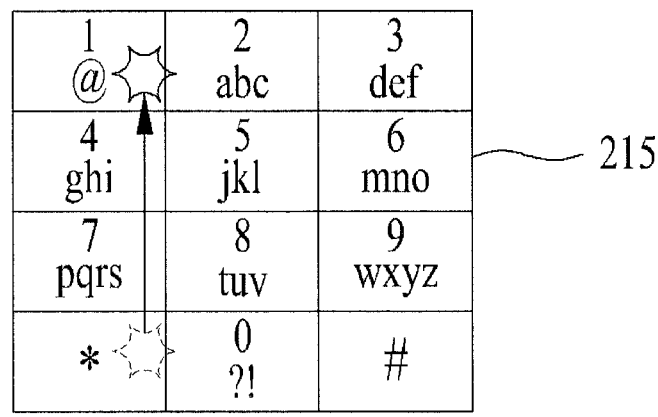

MOBILE TERMINAL AND CONTROLLING METHOD THEREOF

Pursuant to 35 U.S.C. §119(e), this application claims the benefit of priority to Provisional Application No. 61/165,506, filed in the U.S. on Mar. 31, 2009, and to Korean application No. 10-2009-0027821, filed in Korea on Mar. 31, 2009, the contents of which are incorporated by reference herein in their entirety.

BACKGROUND

1. Field

This relates to a mobile terminal, and more particularly, to a mobile terminal and controlling method thereof.

2. Background

A mobile terminal may be configured to perform various functions. Examples of such functions may include data and voice communications, capturing still and moving images using a camera, recording audio, playing music files and outputting music via a speaker system, and displaying images and video on a display. Some terminals may include additional functionality which supports game playing, while other terminals may also be configured as multimedia players. Some mobile terminals may be configured to receive broadcast and multicast signals which permit viewing of videos and television programs.

Ongoing efforts to support and increase the functionality of mobile terminals may include software and hardware improvements, as well as changes and improvements in the structural components of the mobile terminal. For example, numerous different functions may be enabled by various kinds of touchscreen type mobile terminals. In order to execute these diverse functions provided by a touchscreen type mobile terminal, numerous menu icons may be displayed on a touchscreen of the mobile terminal. However, the numerous menu icons may occupy a considerable area of the touchscreen, thereby limiting space utilization of the touchscreen.

BRIEF DESCRIPTION OF THE DRAWINGS

The embodiments will be described in detail with reference to the following drawings in which like reference numerals refer to like elements wherein:

FIGS. 12 to 24 illustrate exemplary display screens on which various methods of controlling a mobile terminal according to embodiments as broadly described herein are implemented.

DETAILED DESCRIPTION

In the following detailed description, reference is made to the accompanying drawing figures which form a part hereof, and which show by way of illustration specific embodiments. It is to be understood by those of ordinary skill in this technological field that other embodiments may be utilized, and structural, electrical, as well as procedural changes may be made without departing from the scope of the disclosure presented herein. Wherever possible, the same reference numbers will be used throughout the drawings to refer to the same or similar parts.

As used herein, the terms 'module', 'unit' and 'part' are used for various elements merely in order to facilitate the explanation thereof. Therefore, significant meanings or roles are not given to the suffixes themselves and it is understood that the 'module', 'unit' and 'part' may be used together or interchangeably.

The systems and methods as embodied and broadly described herein may be applied to various types of terminals. Examples of such terminals may include mobile as well as stationary terminals, such as mobile phones, user equipment, smart phones, DTV, computers, digital broadcast terminals, personal digital assistants, portable multimedia players (PMP), navigators, and other types of terminals as appropriate.

Simply for ease of discussion and illustration, further description will be made with regard to a mobile terminal 100. However, it should be noted that such teachings may apply equally to other types of terminals.

Figure 1:
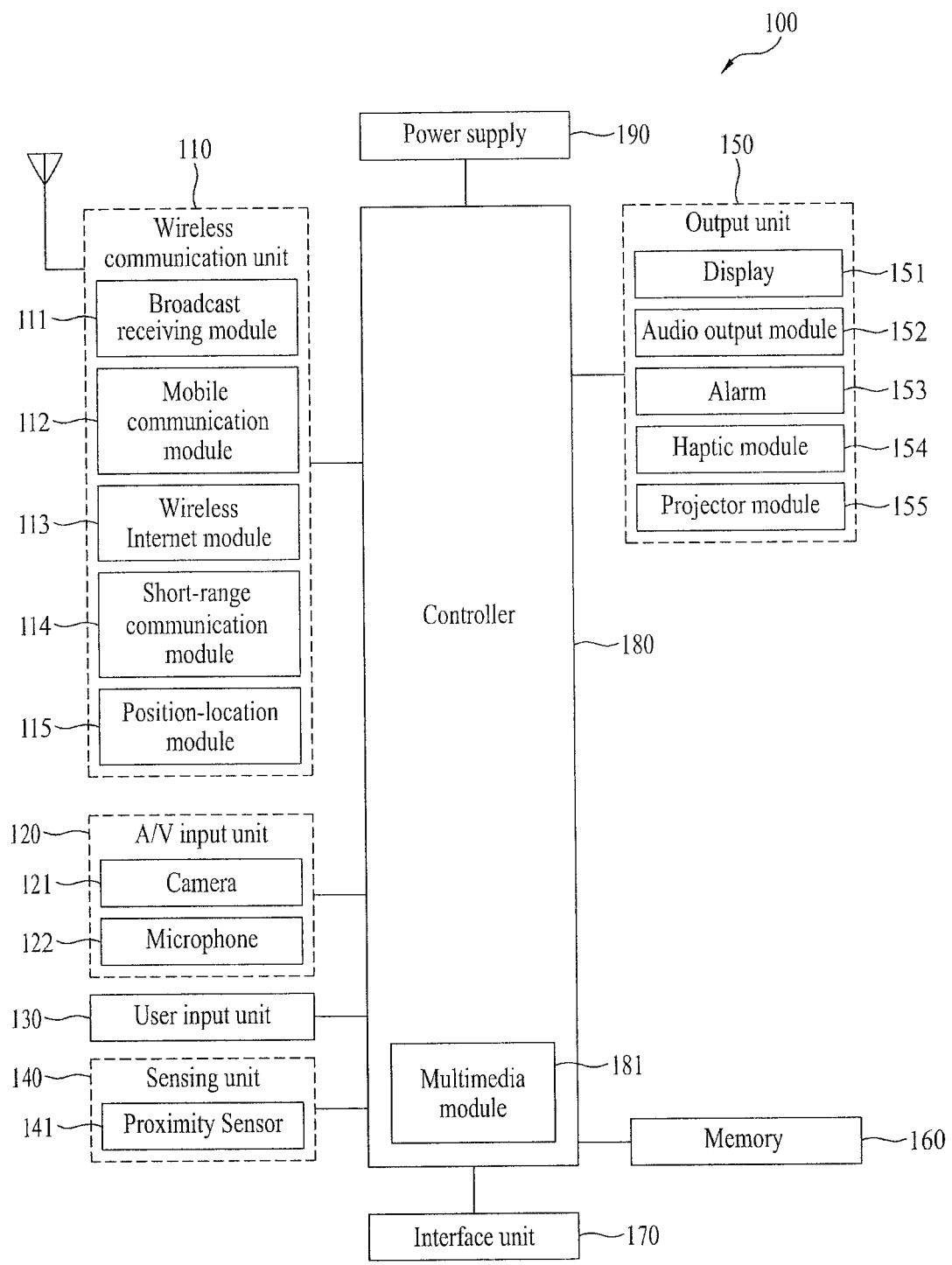
FIG. 1 is a block diagram of a mobile terminal according to an embodiment as broadly described herein.

The mobile terminal 100 according to the embodiment shown in FIG. 1 may include a wireless communication unit 110, an A/V (audio/video) input unit 120, a user input unit 130, a sensing unit 140, an output unit 150, a memory 160, an interface unit 170, a controller 180, and a power supply 190. While FIG. 1 illustrates an exemplary mobile terminal 100 including these various components, it is understood that all of the illustrated components are not necessarily required, and greater or fewer components may alternatively be implemented.

The wireless communication unit 110 may include one or more components which allow for wireless communication between the mobile terminal 100 and a wireless communication system or network within which the mobile terminal 100 is located. For instance, the wireless communication unit 110 may include a broadcast receiving module 111, a mobile communication module 112, a wireless internet module 113, a short-range communication module 114, a position-location module 115, and other such modules as appropriate.

The broadcast receiving module 111 receives a broadcast signal and/or associated broadcast information from an external broadcast managing server via a broadcast channel. The broadcast channel may be, for example, a satellite channel, a terrestrial channel, or other source channel as appropriate. The broadcast managing server generally refers to a server which generates and transmits a broadcast signal and/or associated broadcast information or a server which is provided with a previously generated broadcast signal and/or associated broadcast information and then transmits the provided signal or information to a terminal. The broadcast signal may be implemented as a TV broadcast signal, a radio broadcast signal, a data broadcast signal, or other type of signal as appropriate. In certain embodiments, the broadcast signal may include a broadcast signal combined with a TV or radio broadcast signal.

In certain embodiments, at least two broadcast receiving modules 111 may be provided with the mobile terminal 100 in pursuit of simultaneous reception of at least two broadcast channels or to facilitate broadcast channel switching.

The associated broadcast information may include information associated with a broadcast channel, a broadcast program, a broadcast service provider, and the like. The associated broadcast information may be provided via a mobile communication network. In this case, the associated broadcast information may be received by the mobile communication module 112.

The associated broadcast information may be provided as, for example, an electronic program guide (EPG) of digital multimedia broadcasting (DMB) and/or an electronic service guide (ESG) of digital video broadcast-handheld (DVB-H).

The broadcast receiving module 111 may be configured to receive broadcast signals transmitted from various types of broadcast systems. As a nonlimiting example, such broadcasting systems may include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). The broadcast receiving module 111 may be suitable for other broadcasting systems in addition to the above-explained digital broadcasting systems.

The broadcast signal and/or associated broadcast information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio data, video data, data related to text/multimedia message transceivings, and other types of data as appropriate.

The wireless internet module 113 supports Internet access for the mobile terminal 100. The wireless internet module 113 may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), and other implementations as appropriate.

The short-range communication module 114 facilitates relatively short-range communications. Suitable technologies for implementing the short range communication module 114 may include, for example, radio frequency identification (RFID), infrared data association (IrDA), ultra-wideband (UWB), the networking technologies commonly referred to as Bluetooth and ZigBee, and other related technologies as appropriate.

The position-location module 115 identifies or otherwise obtains the location of the mobile terminal 100. In certain embodiments, the position-location module 115 may be implemented with a global positioning system (GPS) module.

Referring to FIG. 1, the audio/video (A/V) input unit 120 may provide audio or video signal input to the mobile terminal 100. As shown, the A/V input unit 120 may include a camera 121 and a microphone 122. The camera 121 receives and processes image frames of still pictures or video obtained by an image sensor in a video call mode or a photographing mode. The processed image frames may be displayed on the display 151.

The image frames processed by the camera 121 may be stored in the memory 160 or may be externally transmitted via the wireless communication unit 110. In certain embodiments, at least two cameras 121 may be provided to the mobile terminal 100 based on the environment in which the mobile terminal 100 is used.

The microphone 122 receives an external audio signal while the mobile terminal 100 is in a particular mode, such as, for example, a phone call mode, a recording mode, or a voice recognition mode. This audio signal is processed and converted into electronic audio data. The processed audio data is transformed into a format transmittable to a mobile communication base station via the mobile communication module 112 when the mobile terminal 100 is in a call mode. The microphone 122 may include assorted noise removing algorithms to remove noise generated in the course of receiving the external audio signal.

The user input unit 130 may generate input data in response to user manipulation of an associated input device or devices. Examples of such devices may include, for example, a keypad, a dome switch, a touchpad (e.g., static pressure/capacitance), a jog wheel, a jog switch, or other input device as appropriate.

The sensing unit 140 may provide sensing signals for controlling operations of the mobile terminal 100 based on status measurements of various aspects of the mobile terminal 100. For instance, the sensing unit 140 may detect an open/close status of the mobile terminal 100, a relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, or other status measurement as appropriate. As an example, in a mobile terminal 100 configured as a slide-type mobile terminal, the sensing unit 140 may sense whether a sliding portion of the mobile terminal is open or closed. In other examples the sensing unit 140 may sense the presence or absence of power provided by the power supply 190, the presence or absence of a coupling or other connection between the interface unit 170 and an external device, or other connection as appropriate. In certain embodiments, the sensing unit 140 may include a proximity sensor 141.

The output unit 150 may generate visual output, audible output, touch sensitive output, or other output as appropriate. The output unit 150 may include the display 151, an audio output module 152, an alarm unit 153, a haptic module 154, a projector module 155 and other modules as appropriate.

The display 151 may visually display (output) information associated with the mobile terminal 100. For instance, if the mobile terminal 100 is operating in a phone call mode, the display 151 may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI as appropriate.

The display module 151 may be implemented using various different display technologies including, for example, a liquid crystal display (LCD), a thin film transistor-liquid crystal display (TFT-LCD), an organic light-emitting diode display (OLED), a flexible display, a three-dimensional display, or other type of display as appropriate. The mobile terminal 100 may include one or more of such displays.

Some of the above displays may be implemented as a transparent or optical transmittive type, which may be referred to as a transparent display. As a representative example of transparent display is TOLED (transparent OLED) or the like. A rear configuration of the display 151 may be implemented as an optical transmittive type as well. In this configuration, a user may see an object at a rear of a terminal body via the area occupied by the display 151 of the terminal body.

In certain embodiments, the mobile terminal 100 may include least two displays 151. For instance, a plurality of displays 151 may be arranged on a single face of the mobile terminal 100, either spaced apart from each other or built as a single body. Alternatively, a plurality of displays 151 may be arranged on different faces of the mobile terminal 100.

In a case in which the display 151 and a sensor for detecting a touch action (hereinafter referred to as a 'touch sensor') form a mutual layer structure (hereinafter collectively referred to as a 'touchscreen'), the display 151 may be used as an input device as well as an output device. In this case, the touch sensor may be, for example, a touch film, a touch sheet, a touchpad or the like.

If the mobile terminal 100 is provided with a pair of displays 151, one of the two displays 151 may be a main display and the other may be a sub-display. The main display and the sub-display may be arranged on a same surface of the mobile terminal 100 while being physically separated from each other. An image, which may be equal to at least one portion of an image displayed on the main display, or totally different from the image displayed on the main display, may be displayed on the sub-display. A wheel type input unit may be displayed around the sub-display.

In certain embodiments, at least one of the two displays may include a touchscreen.

The touch sensor may be configured to convert a pressure applied to a specific portion of the display 151 or a variation of a capacitance generated from a specific portion of the display 151 to an electric input signal. Moreover, in certain embodiments the touch sensor may detect an amount of pressure of a touch and/or a touched position or size and/or a touch duration.

If a touch input is made to the touch sensor, signal(s) corresponding to the touch are transferred to a touch controller. The touch controller processes the signal(s) and then transfers the processed signal(s) to the controller 180 and the controller 180 determines whether a prescribed portion of the display 151 has been touched.

Referring to FIG. 1, a proximity sensor 141 may be provided to an internal area of the mobile terminal 100 enclosed by the touchscreen or around the touchscreen. The proximity sensor 141 may detect a presence or absence of an object approaching a prescribed detecting surface or an object existing around the proximity sensor 141 using, for example, an electromagnetic field strength or infrared ray, without mechanical/physical contact. Hence, such a proximity sensor may have better durability and more utility than that of a contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, or other type of sensor as appropriate. If, for example, the touchscreen includes an electrostatic capacity proximity sensor, the sensor the proximity of a pointer using a variation of electric field according to the proximity of the pointer. In this case, the touchscreen (touch sensor) may be classified as the proximity sensor.

In the following description, for clarity, an action in which a pointer approaches a touchscreen without contacting with the touchscreen and is recognized as located on a particular (corresponding) point on the touchscreen is referred to as a 'proximity touch'. And, an action in which a pointer actually touches the touchscreen is referred to as a 'contact touch'. The position on the touchscreen that is proximity-touched by the pointer corresponds to the position of the pointer which vertically opposes the touchscreen when the pointer performs the proximity touch.

The proximity sensor may detect, for example, a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touch screen.

The audio output module 152 may function in various modes including a call-receiving mode, a call-placing mode, a recording mode, a voice recognition mode, a broadcast reception mode and other such modes so as to output audio data which has been received from the wireless communication unit 110 or is stored in the memory 160. During operation, the audio output module 152 outputs audio relating to a particular function (e.g., call received, message received, etc.). The audio output module 152 may include, for example, one or more speakers, buzzers, other audio producing devices, and combinations thereof.

The alarm unit 153 may output a signal that announces the occurrence of a particular event associated with the mobile terminal 100, such as, for example, a call received event, a message received event, a touch input received event, or other such event. The alarm unit 153 may also output an announcement signal using a vibration, video or audio signal. The video or audio signal may be outputted via the display 151 or the audio output unit 152. Hence, the display 151 or the audio output module 152 may be considered as a part of the alarm unit 153 in this situation.

The haptic module 154 may generate various tactile effects that may be sensed by a user. For example, vibration may be one of the tactile effects generated by the haptic module 154. Strength and pattern of the vibration generated by the haptic module 154 may be controllable. For instance, different vibrations may be outputted in a manner of being synthesized together, or may be outputted in sequence.

The haptic module 154 may generate various other tactile effects in addition to vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to contact with an electrode, an effect attributed to electrostatic force, an effect attributed to the representation of hold/cold sense using an endothermic or exothermic device, and other effects as appropriate.

The haptic module 154 may enable a user to sense the tactile effect through a muscle sense of a finger, arm or the like, and to transfer the tactile effect through direct contact. In certain embodiments, at least two haptic modules 154 may be provided with the mobile terminal 100, based on the type of the mobile terminal 100.

The projector module 155 may perform an image projection function using the mobile terminal 100. The projector module 155 may display an image, which may be identical to or partially different from the image displayed on the display 151, on an external screen or wall in response to a control signal from the controller 180.

In particular, the projector module 155 may include a light source that generates light (e.g., laser) for projecting an image externally, an image producing means for producing an image to output externally using the light generated from the light source, and a lens for enlarging the image to be output externally at a predetermined focus distance. The projector module 155 may also include a device for adjusting an image projection direction by mechanically moving the lens or the whole module 155.

The projector module 155 may be one of a CRT (cathode ray tube) module, an LCD (liquid crystal display) module, a DLP (digital light processing) module or the like. In particular, the DLP module may enable the light generated from the light source to reflect on a DMD (digital micro-mirror device) chip, and may be advantageous in making the projector module 151 smaller.

In certain embodiments, the projector module 155 may be provided in a length direction of a lateral, front or backside direction of the mobile terminal 100. In alternative embodiments, the projector module 155 may be provided at any portion of the mobile terminal 100 according to the necessary functionality thereof.

The memory unit 160 may store various types of data to support the processing, control, and storage requirements of the mobile terminal 100. Examples of such data include program instructions for applications operating on the mobile terminal 100, contact data, phonebook data, messages, audio, still pictures, moving pictures and other such data. A recent use history or a cumulative use frequency of each type of data (e.g., use frequency for each phonebook, each message or each multimedia item) may also be stored in the memory unit 160. Data for various patterns of vibration and/or sound outputted in the case of a touch input to the touchscreen may also be stored in the memory unit 160.

The memory 160 may be implemented using numerous types or combinations of suitable volatile and non-volatile memory or storage devices including, for example, hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. The mobile terminal 100 may operate in association with a web storage system for performing a storage function of the memory 160 on Internet.

The interface unit 170 may couple the mobile terminal 100 to external devices. The interface unit 170 receives data and/or power from the external devices and then transfers the data and/or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be chip for storing various kinds of information for authenticating use authority of the mobile terminal 100, and may include a User Identify Module (UIM), a Subscriber Identify Module (SIM), a Universal Subscriber Identity Module (USIM) and/or the like. A device having the identity module (hereinafter called 'identity device') may be manufactured as a smart card. Therefore, the identity device may be connected to the mobile terminal 100 via the corresponding port.

When the mobile terminal 110 is connected to an external cradle, the interface unit 170 may form a passage for supplying the mobile terminal 100 with power from the cradle or a passage for delivering various command signals inputted at the cradle by a user to the mobile terminal 100. Each of the various command signals or the power may operate as a signal enabling the mobile terminal 100 to recognize that it is correctly loaded in the cradle.

The controller 180 may control overall operation of the mobile terminal 100. For example, the controller 180 performs the control and processing associated with voice calls, data communications, video calls, and the like. The controller 180 may include a multimedia module 181 that provides multimedia playback. The multimedia module 181 may be configured as part of the controller 180, or implemented as a separate component. The controller 180 may also perform a pattern recognizing process for recognizing a writing input and a picture drawing input carried out on the touchscreen as characters or images, respectively.

The power supply 190 provides power required by the various components of the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perforin the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes may be implemented with a software application written in any suitable programming language and may be stored in memory such as, for example, the memory 160, and executed by a controller or processor, such as, for example, the controller 180.

Figure 2A:
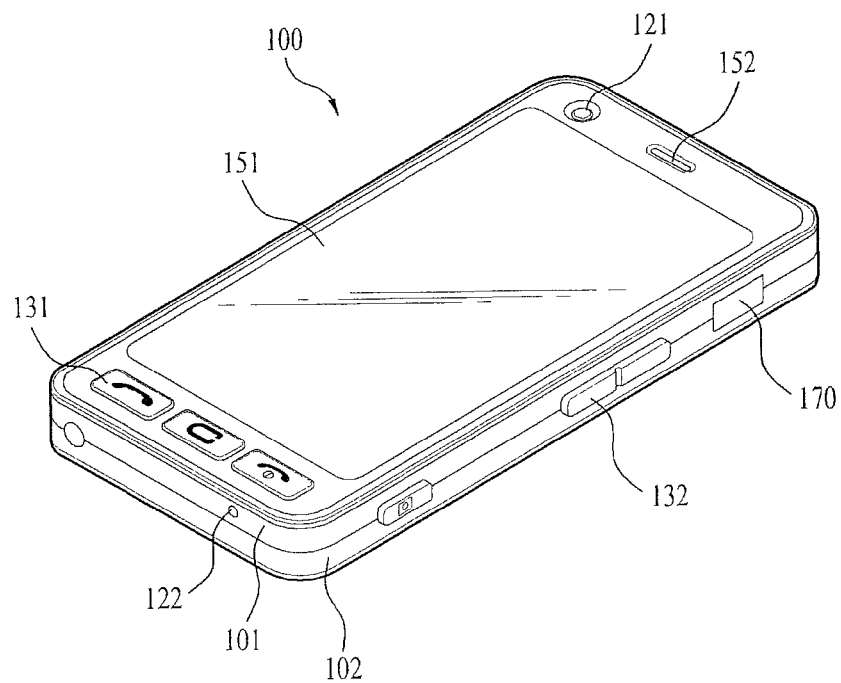
FIG. 2A is a front perspective view of a mobile terminal according to an embodiment as broadly described herein.

The exemplary mobile terminal 100 shown in FIG. 2A has a bar shaped terminal body. However, the mobile terminal 100 may be implemented in a variety of different configurations, such as, for example, a folder-type, a slide-type, a rotational-type, a swing-type and various combinations thereof. Simply for ease of discussion, further description will primarily relate to a bar-type mobile terminal 100. However the teachings set forth herein may be equally applied to other types of mobile terminals.

Referring to FIG. 2A, the mobile terminal 100 includes a case (casing, housing, cover, etc.) that defines an exterior thereof. In this embodiment, the case may include a front case 101 and a rear case 102. Various electric/electronic parts may be installed in a space provided between the front and rear cases 101 and 102. In certain embodiments, at least one middle case may also be provided between the front and rear cases 101 and 102. The cases 101 and 102 may be formed by injection molding of synthetic resin, or may be formed of a metal material such as stainless steel (STS), titanium (Ti) or other metal material as appropriate.

A display 151, an audio output unit 152, a camera 121, user input units 130/131 and 132, a microphone 122, an interface 170 and the like, as previously discussed, may be provided with the terminal body, and more particularly, at the front case 101.

The display 151 occupies a large portion of a main face of the front case 101. The audio output unit 151 and the camera 121 may be provided at an area adjacent to a first of two end portions of the display 151, while the user input unit 131 and the microphone 122 may be provided at another area adjacent to a second end portion of the display 151. The user input unit 132 and the interface 170 may be provided at lateral sides of the front and rear cases 101 and 102. Other arrangements may also be appropriate.

The input unit 130 may be manipulated to receive a command for controlling an operation of the terminal 100, and may include a plurality of manipulating units 131 and 132 each having a tactile manner that produces a tactile feeling in response to user manipulation.

Content inputted via the first or second manipulating unit 131 or 132 may be set for a plurality of different functions. For instance, commands as start, end, scroll and the like may be input via the first manipulating unit 131. Similarly, a command for volume adjustment of sound output by the audio output unit 152, a command for switching to a touch recognizing mode of the display 151, or the like may be input via the second manipulating unit 132.

Figure 2B:
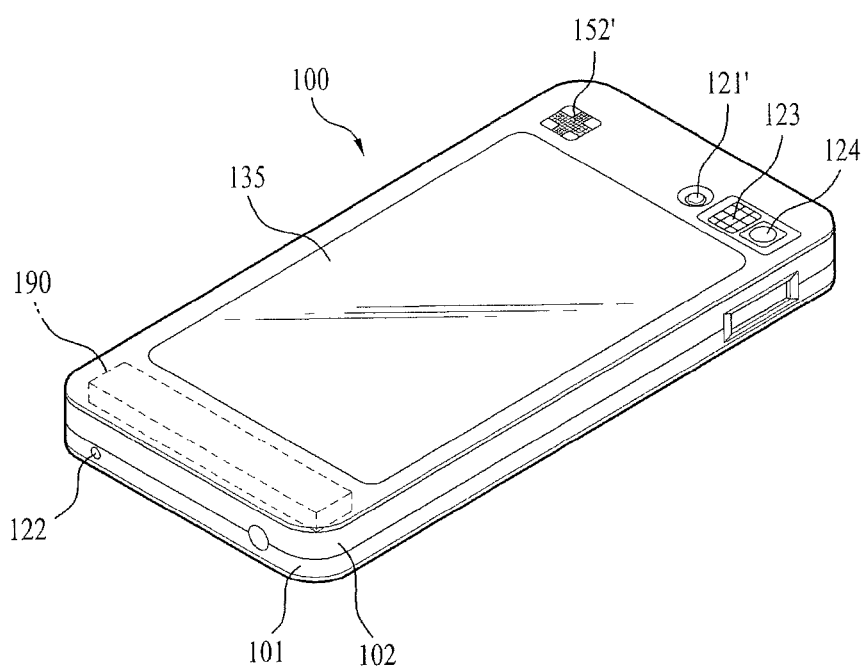
FIG. 2B is a rear perspective view of a mobile terminal according to an embodiment as broadly described herein.

As illustrated in the rear perspective view shown in FIG. 2B, a camera 121' may also be provided on a backside of the terminal body, at the rear case 102. The camera 121' may have a photographing direction that is substantially opposite to that of the front camera 121 shown in FIG. 2A and may have pixels differing from those of the front camera 121. For example, the front camera 121 may be configured to capture and transmit a picture of user's face for a video call, while the rear camera 121' may be configured to capture a general subject for a photo without transmitting the captured subject. Each of the cameras 121 and 121' may be installed at the terminal body so as to be rotated or popped up.

A flash 123 and a mirror 124 may provided adjacent to the camera 121'. The flash 123 projects light toward a subject when photographing the subject using the camera 121'. In case that a user attempts to take a picture of the user (self-photography) using the camera 121', the mirror 124 allows the user to view user's face reflected by the mirror 124.

An additional audio output unit 152' may be provided on the backside of the terminal body. The rear audio output unit 152' may provide a stereo function together with the front audio output unit 152 shown in FIG. 2A and may be used for implementation of a speakerphone mode.

A broadcast signal receiving antenna may also be provided at a lateral side of the terminal body, as well as an antenna for communication and the like. The antenna may be included as a portion of the broadcast receiving module 111 shown in FIG. 1, and may be retractably provided in the terminal body.

A power supply 190 that supplies power to the terminal 100 may be installed within the terminal body. Alternatively, the power supply 190 may be detachably connected to the terminal body.

A touchpad 135 for detecting a touch may be provided at the rear case 102. The touchpad 135 may be, for example, a light transmittive type like the display 151. In this case, if the display 151 is configured to output visual information from its both faces, it is able to recognize the visual information via the touchpad 135 as well. The information outputted from both of the faces of the display 151 may be entirely controlled by the touchpad 135. Alternatively, a display may be provided with the touchpad 135 so that a touchscreen may be provided on the rear case 102.

The touchpad 135 may be interconnected with the display 151 of the front case 101 and be aligned with a rear of the display 151. A size of the touchpad 135 may be less than or equal to that of the display 151.

Figure 3:
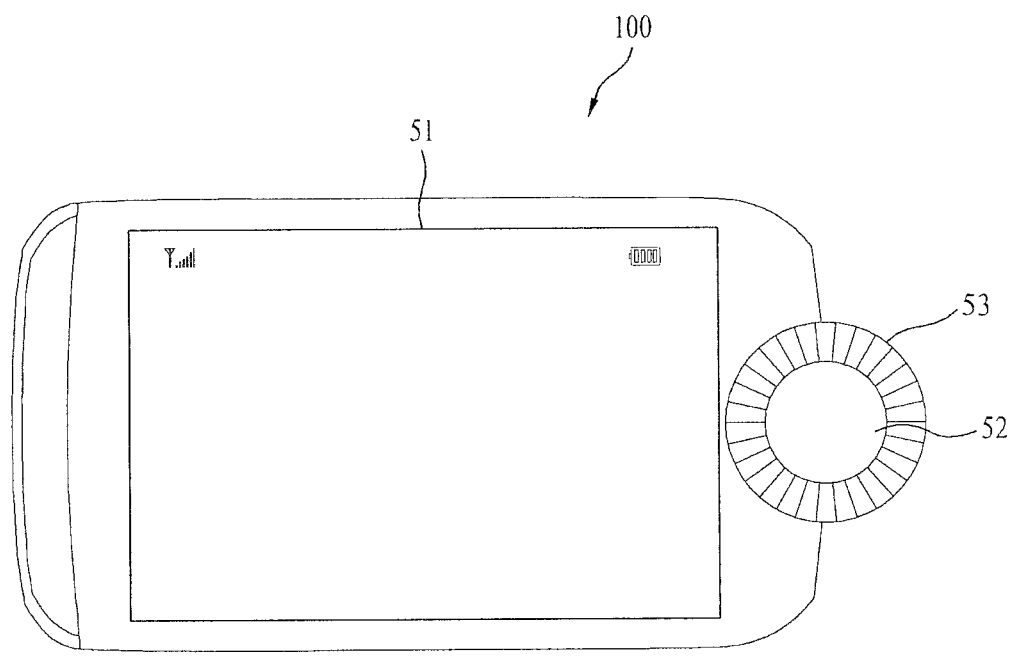
FIG. 3 is a front view of a mobile terminal according to an embodiment as broadly described herein.

In certain embodiments, a sub-display and a touch wheel may also be provided with the mobile terminal 100, as shown in FIG. 3. This mobile terminal 100 includes a main display 51 including a touchscreen, a sub-display 52 physically separated from the main display 51, and a touch wheel 53 provided around the sub-display 52. A terminal user may implement a control action on the terminal 100 by performing a clockwise or counterclockwise touch & drag on the touch wheel 53 with a finger or other touching/pointing implement. The main display 51 and the touch wheel 53 may be considered a first touch unit and a second touch unit, respectively. The sub-display 52 may display a menu item or a submenu item selected in the mobile terminal 100. Therefore, the embodiment shown in FIG. 3 may be implemented even without the sub-display 52. Using the first touch unit and the second touch unit, a prescribed one of the diverse functions provided by the mobile terminal 100 may be selected and executed as follows.

Figure 4:
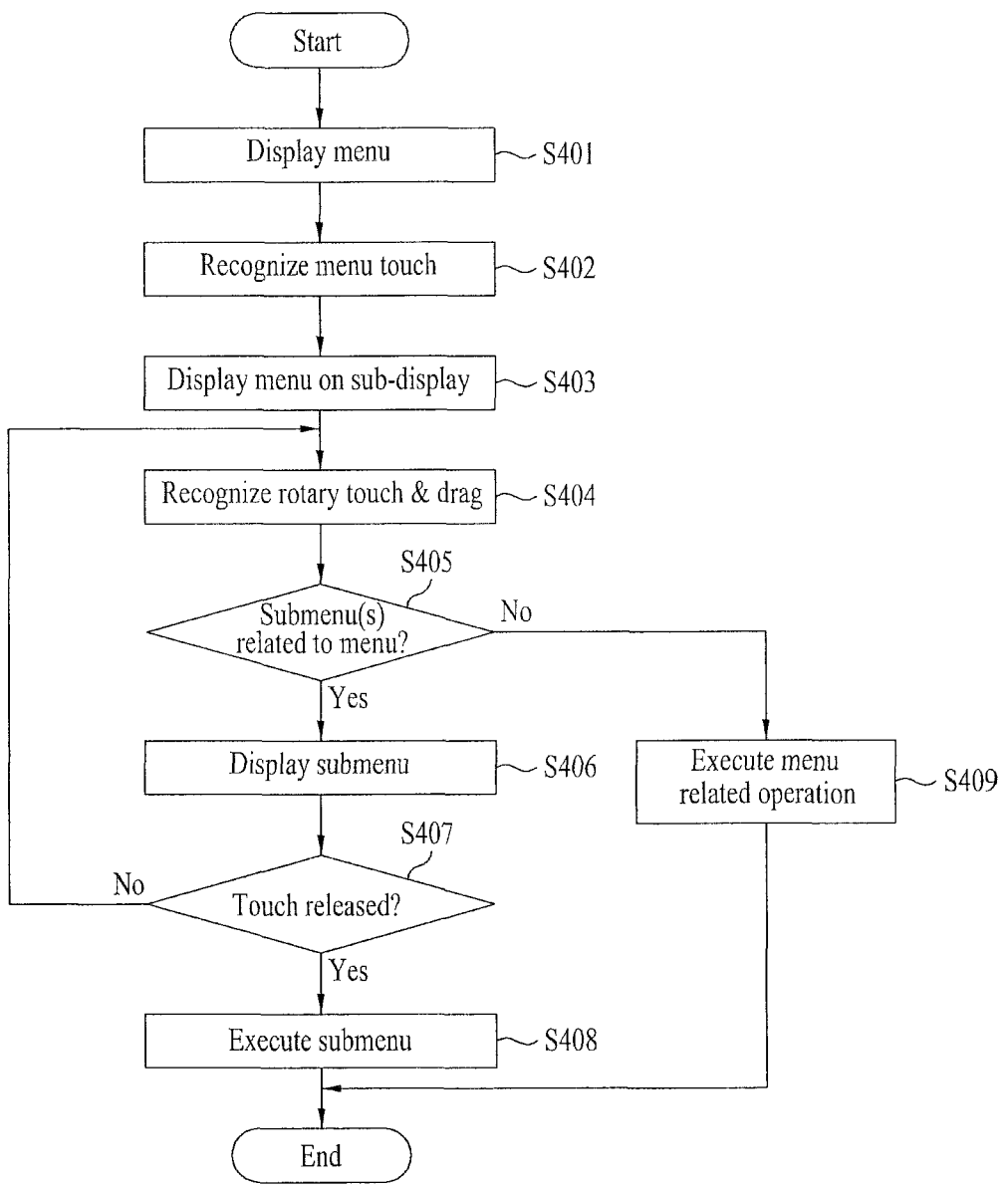
FIG. 4 is a flowchart for a method of controlling a mobile terminal according to an embodiment as broadly described herein.

FIG. 4 is a flowchart of a method of controlling a mobile terminal according to an embodiment as broadly described herein. As shown in FIG. 4, one or more menu items are displayed on the main display 51 corresponding to the first touch unit [S401]. If one of the menu items displayed on the main display 51 is touched with a pointing implement such as a finger, a stylus, or other implement as appropriate, the controller 180 recognizes the touch made by the terminal user [S402], and the menu item selected by the touch is displayed on the sub display 52 [S403].

Subsequently, while the terminal user touches the menu item displayed on the main display 51 (using, for example, a first touching/pointing implement, such as, for example, a left thumb or finger), the terminal user may also perform a touch & drag, clockwise or counterclockwise, on the touch wheel 53 (using, for example, a second touching/pointing implement, such as, for example, a right thumb or finger). If such a touch and drag on the touch wheel 53 is performed, the controller 180 recognizes the touch and drag the touch wheel 53 while the touch on the menu item is maintained [S404]. The controller 180 performs a control operation in accordance with the touch and drag on the touch wheel 53 and attributes of the selected/touched menu. That is, the controller 180 checks whether the menu item, which is displayed on the main display 51 and is selected by the user, includes submenu items [S405].

If the menu item includes submenu items, the controller 180 displays the submenu items in one region of the main display 51 so that it does not overlap the selected menu item [S406]. In doing so, the menu item and/or the submenu item may be displayed as an overlay on a background image.

If the main display 51 is too small to display the submenu items on one screen, only one of the submenu items may be displayed. If a touch & drag is performed on the touch wheel 53, the displayed menu item disappears and other submenu items are sequentially displayed.

In alternative embodiments, the submenu items may be downsized enough to be displayed on one screen of the main display 51, so that if a touch & drag is performed on the touch wheel 53, the submenu items may be displayed one by one, being sequentially enlarged. The submenu items may be enlarged one by one at a center part of the screen to clearly indicate that a user-specific item has been selected.

A submenu item for returning to a main menu without executing any function may be provided among the submenu items.

Thus, in a case in which the menu items include submenu items, the corresponding submenu items may be displayed on the main display 51 [S406].

Thus, the corresponding submenu items may be displayed when a particular menu item is selected. Alternatively, the submenu items may be displayed after a touch & drag of the touch wheel 53 is initiated. In this case, the submenu items are displayed in one region of the main display 51 so as to not overlap the selected menu item. In doing so, the menu item and/or the submenu items may be displayed as an overlay on a background image.

When a specific one of the submenu items is displayed alone and selected, or a specific submenu item is enlarged and selected from the submenu items the touch may be released from at least one of the main display 51 and the touch wheel 53 [S407]. If the touch is released, the controller 180 executes the selected submenu [S408].

If the selected menu item does not include submenu items, the controller 180 executes operation related to the selected menu item [S409]. For example, a zoom operation may be performed to enlarge or reduce a screen of the main display 51 in response to a corresponding selected menu item.

Further explanation of the method of controlling the above-described mobile terminal shown in FIG. 4 is provided in FIGS. 5 to 8 as follows. Simply for ease of discussion, it is assumed that such control is executed while the mobile terminal 100 is performing a photo view function. However, this may be applied while another function is being performed by the mobile terminal 100.

Figure 5A:
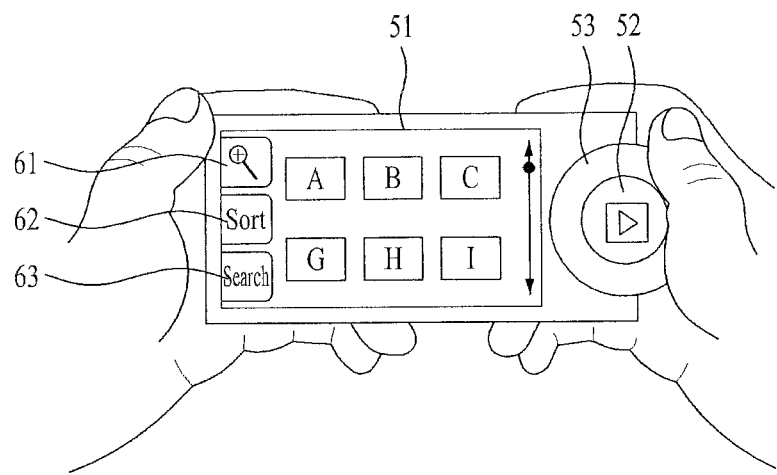
FIG. 5A and FIG. 5B illustrate a display screen employing a screen scroll function in a photo view mode.
Figure 5B:
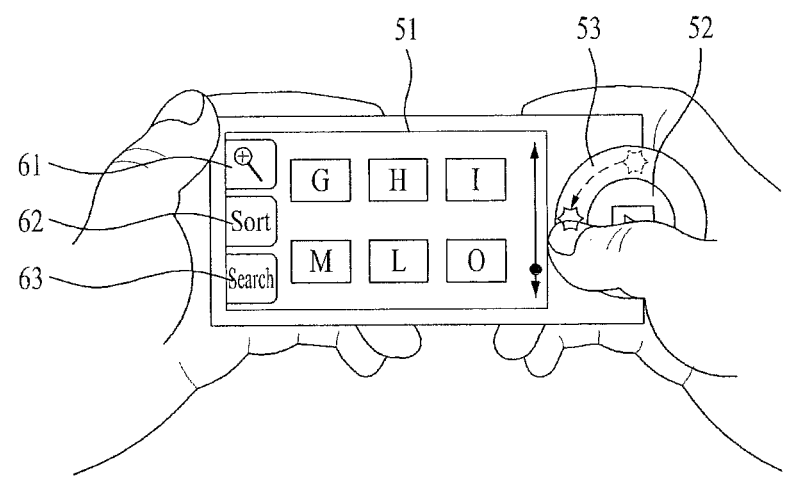

Referring to the exemplary mobile terminal shown in FIG. 5A, a plurality of photos A, B, C, G, H, and I may be displayed on the main display 51, and menu items 61, 62, and 63 may be displayed along one side of the main display 51. A user touches the touch wheel 53, without touching the menu items 61-63 to perform a rotary touch & drag counterclockwise (or clockwise). As shown in FIG. 5B, the touch and drag on the touch wheel 53 causes the plurality of photos to be scrolled up (or down) on the main display 51 so that photos G, H, I, M, L, and O are now displayed. Although FIG. 5B shows the plurality of photos are scrolled up (or down), the photos may also be scrolled right (or left).

Figure 6A:
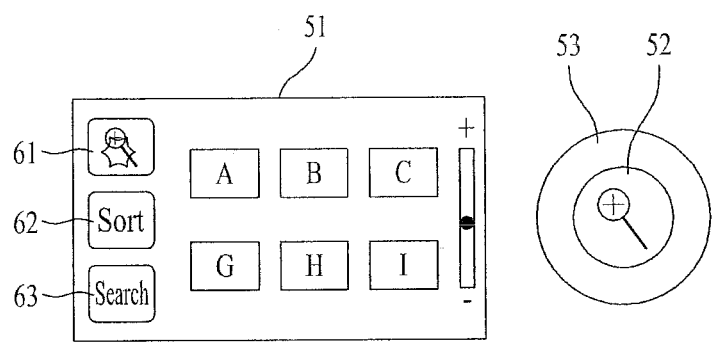
FIGS. 6A to 6F illustrate a display screen employing a screen zoom adjustment function in a photo view mode.

Referring to FIG. 6A, a plurality of photos A, B, C, G, H and I are displayed on the main display 51, and menu items 61-63 are displayed at one side of the main display 51, including a zoom item 61, a sorting item 62 and a search item 63. Other menu items may also be displayed. For example, some of the menu items 61-63 may be removed and/or other menu items may be additionally displayed.

If a user touches and selects the zoom item 61 from the menu items 61-63, the selected zoom item 61 may be displayed on the sub-display 52, as shown in FIG. 6A.

Figure 6B:
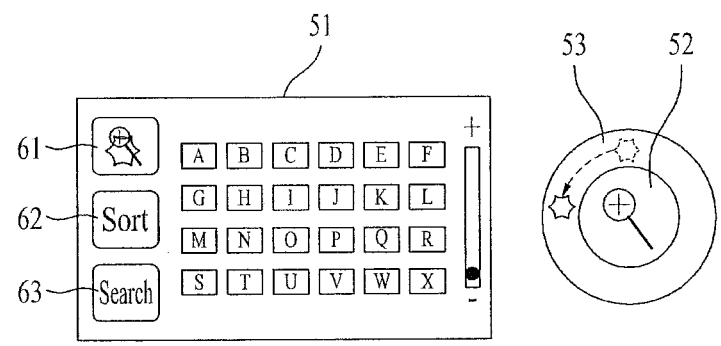

While the zoom item 61 is being touched, if the user also touches the touch wheel 53 and then performs a rotary touch & drag counterclockwise (or clockwise), a separate submenu item is not displayed on the main display 51 since the zoom item 61 does not have a separate submenu. Instead, as shown in FIG. 6B, the photos A-X now displayed on the main display 51 may be displayed in a zoom-out manner in proportion to a distance of the rotary touch & drag, thus allowing each of the photos to be displayed smaller and more photos to be displayed on a single screen.

Figure 6C:
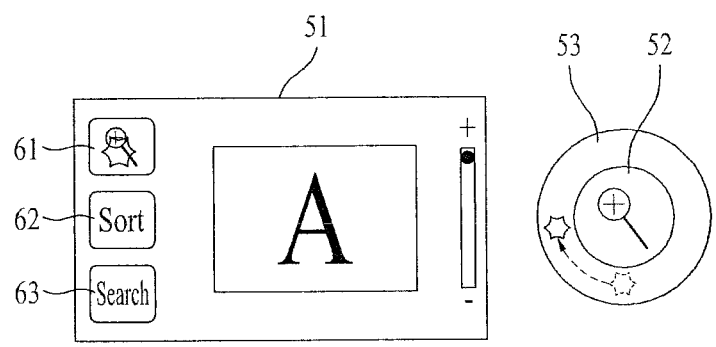

Alternatively, if the user touches the touch wheel 53 while also touching the zoom item 61 and then performs a rotary touch & drag clockwise (or counterclockwise) the photos displayed on the main display 51 may be displayed in a zoom-in manner in proportion to a distance of the rotary touch & drag, as shown in FIG. 6C. That is, if the rotary touch & drag performed on the touch wheel 53 clockwise (or counterclockwise) continues to be performed, one of the photos can be displayed in zoom-in manner. In the example shown in FIG. 6C a photo A located at an uppermost left end of the arrangement photos shown in FIG. 6B is displayed in a zoom-in manner.

Figure 6D:
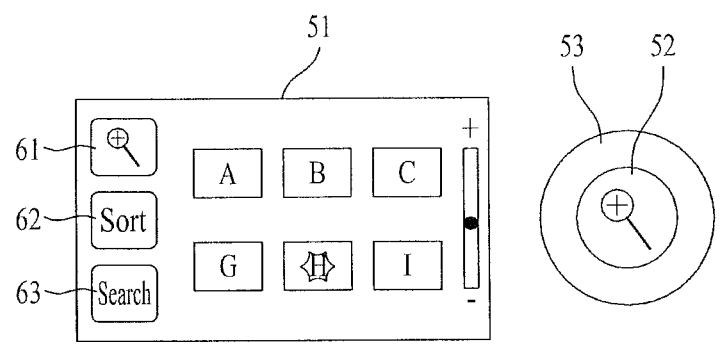
Figure 6E:
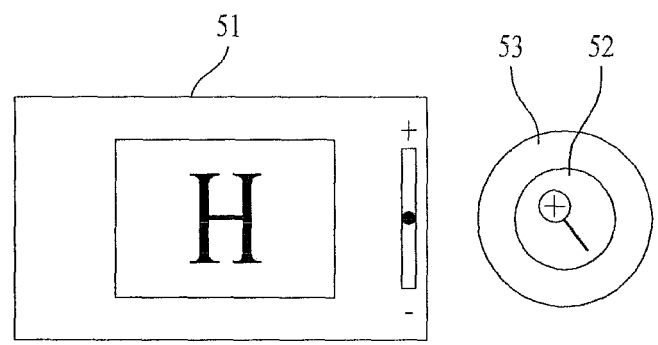
Figure 6F:
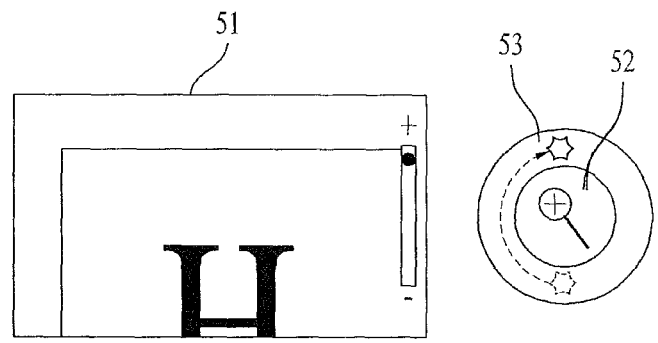

As shown in FIG. 6D, while the plurality of photos are being displayed on the main display 51, photo H may be selected by touching photo H with the pointing implement. Then, as shown in FIG. 6E, the selected photo H is displayed by itself, while the other items are no longer displayed on the main display 51. Then, as shown in FIG. 6F, the user may perform a rotary touch & drag clockwise or counterclockwise on the touch wheel 53 to zoom in or out on photo H on the main display 51.

Figure 7A:
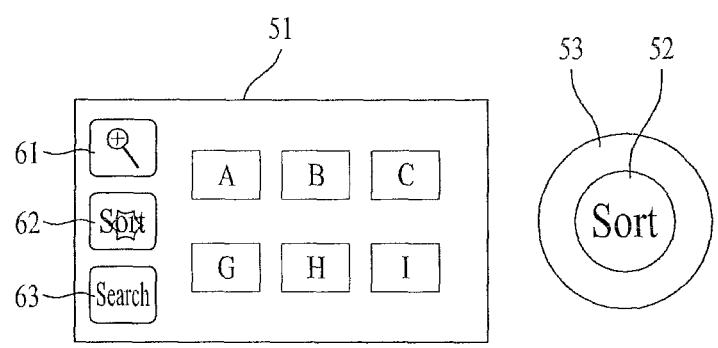
FIGS. 7A to 7E illustrate a display screen employing a photo sorting function in a photo view mode.

Referring to FIG. 7A, if the plurality of photos A, B, C, G, H and I are displayed on the main display 51 and the sorting item 62 is touched and selected from the menu items 61-63, the selected sorting item 62 may be displayed on the sub-display 52.

Figure 7B:
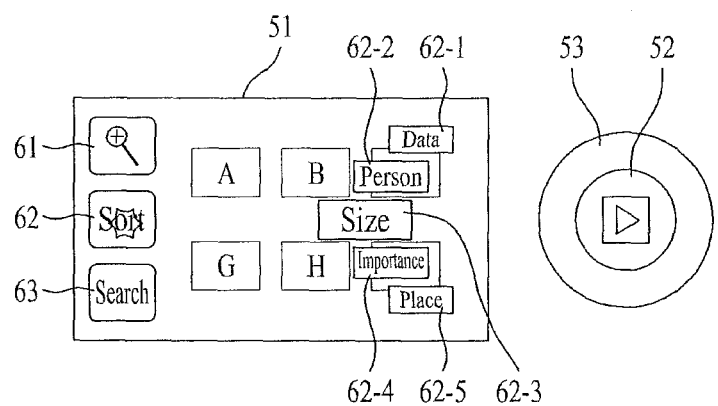
Figure 7C:
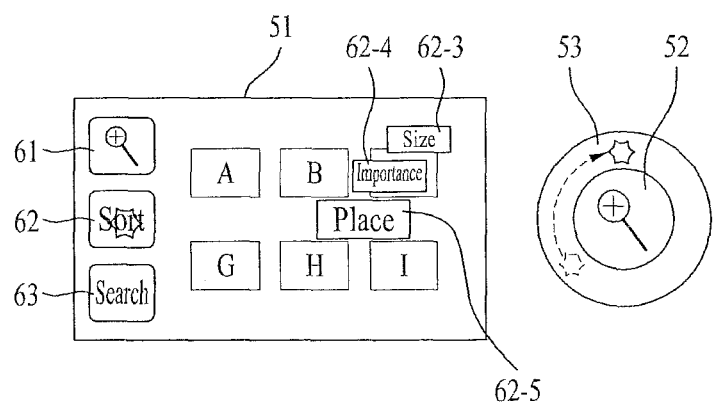

Then, as shown in FIG. 7B, submenu items 62-1 to 62-5 associated to the sorting item 62 may be displayed on the main display 51. For example, in FIG. 7B a size item 62-3 is displayed larger than the rest of the submenu items 62-1, 62-2, 62-4 and 62-5, making it easier for the user to select the size item 62-3 from the submenu items 62-1 to 62-5. If the user touches the touch wheel 53 while also touching the sorting item 62 and then performs a rotary touch & drag clockwise or counterclockwise, as shown in FIG. 7C, this causes the sub-menu items 62-1 and 62-5 to scroll, and a place item 62-5, which is one of the submenu items associated with the sorting item 62, to be displayed as the largest in size on the main display 51.

Figure 7D:
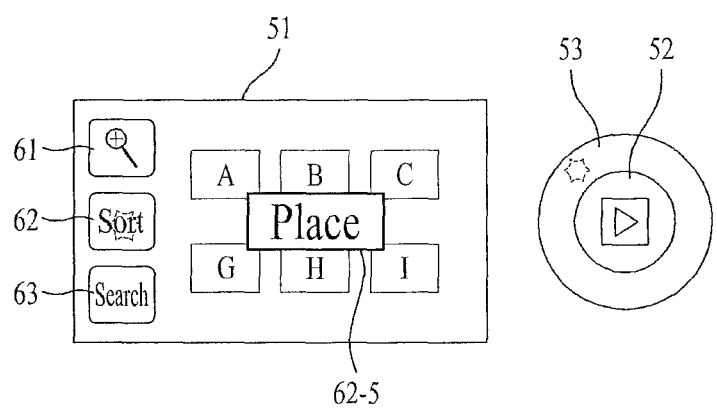
Figure 7E:
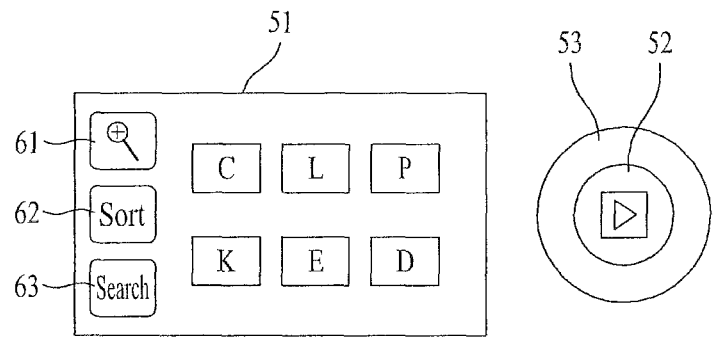

As shown in FIG. 7D, when the place item 62-5 is displayed as the largest in size on the main display 51, both the touch on the sorting item 62 and the touch on the touch wheel 62-5 may be released together. The place item 62-5 may be temporarily displayed in a further enlarged state on the main display 51 to clearly inform the user that the place item 62-5 has been selected. As shown in FIG. 7E, the photos displayed on the main display 51 may then be displayed in a manner of being sorted by photographed places. In this case, the photographed places may be included as tag information with the photos.

Figure 8A:
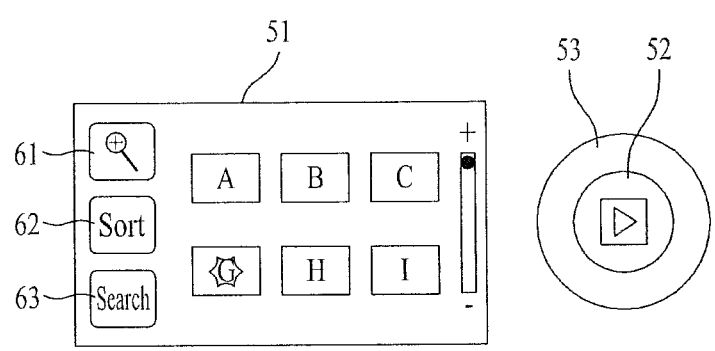
FIGS. 8A to 8F illustrate a display screen employing a photo lock function in a photo view mode.
Figure 8B:
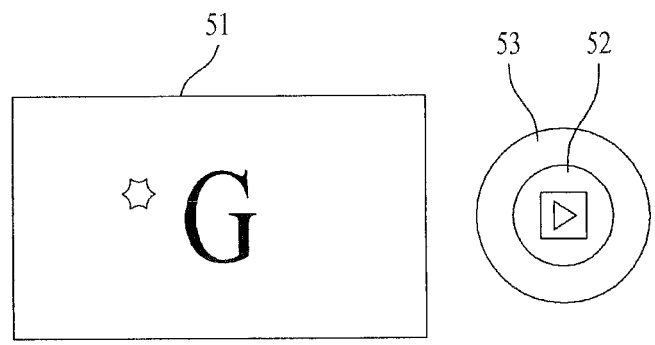
Figure 8C:
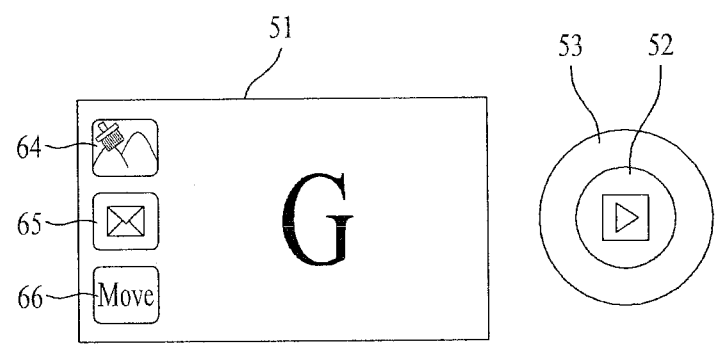

Referring to FIG. 8A, when a plurality of photos A, B, C, G, H and I are displayed on the main display 51, a photo G of the plurality of photos may be selected by being touched by a touching implement. As shown in FIG. 8B, in this embodiment, this touch causes the other menu items to disappear from the main display 51, and only the selected photo G to be displayed. If the main display 51 is then touched, menu items associated with the selected photo G, such as, for example, a photo information edit item 64, a photo transmit item 65 and a move item 66 may be displayed on the main display 51, as shown in FIG. 8C.

Figure 8D:
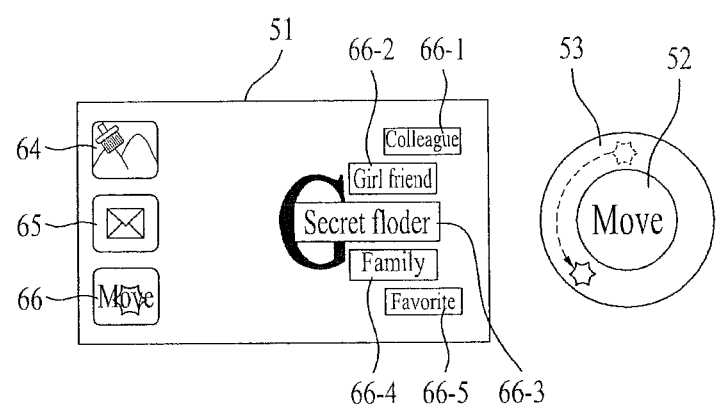
Figure 8E:
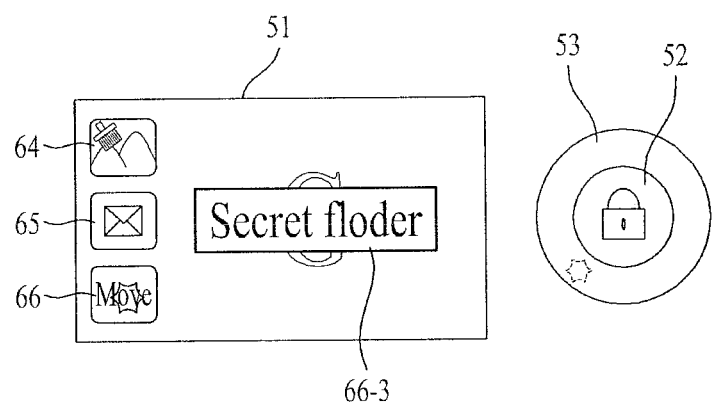
Figure 8F:
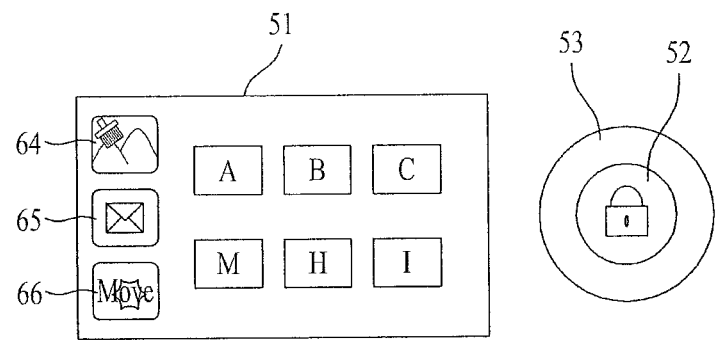

As shown in FIG. 8D, if the move item 66 is touched, the move item 66 may be displayed on the sub-display 52 and folders 66-1 to 66-5 capable of storing the selected photo G therein may be displayed on the main display 51. As mentioned in the foregoing description, one of the folders 61-1 to 66-5 may be selected and enlarged by performing a rotary touch & drag on the touch wheel 53 while the move item 66 is being touched. FIG. 8D shows, for example, that a secret folder 66-3 among the folders has been selected, enlarged and displayed. Once the touch to the move item 66 and the touch to the touch wheel 53 are released, the photo G moves into the secret folder 66-3, the photo G is no longer displayed on the main display 51, as shown in FIG. 8F.

In the above description, when the touch to the move item 66 and the touch to the touch wheel 53 are released, the photo G moves into the secret folder 66-3. However, in alternative embodiments, if the sub-display 52 includes a touchscreen, the photo G may move into the selected folder after the touch to the move item 66 and the touch to the touch wheel 53 have been released and the sub-display 52 has been touched again to confirm the move.

Figure 9:
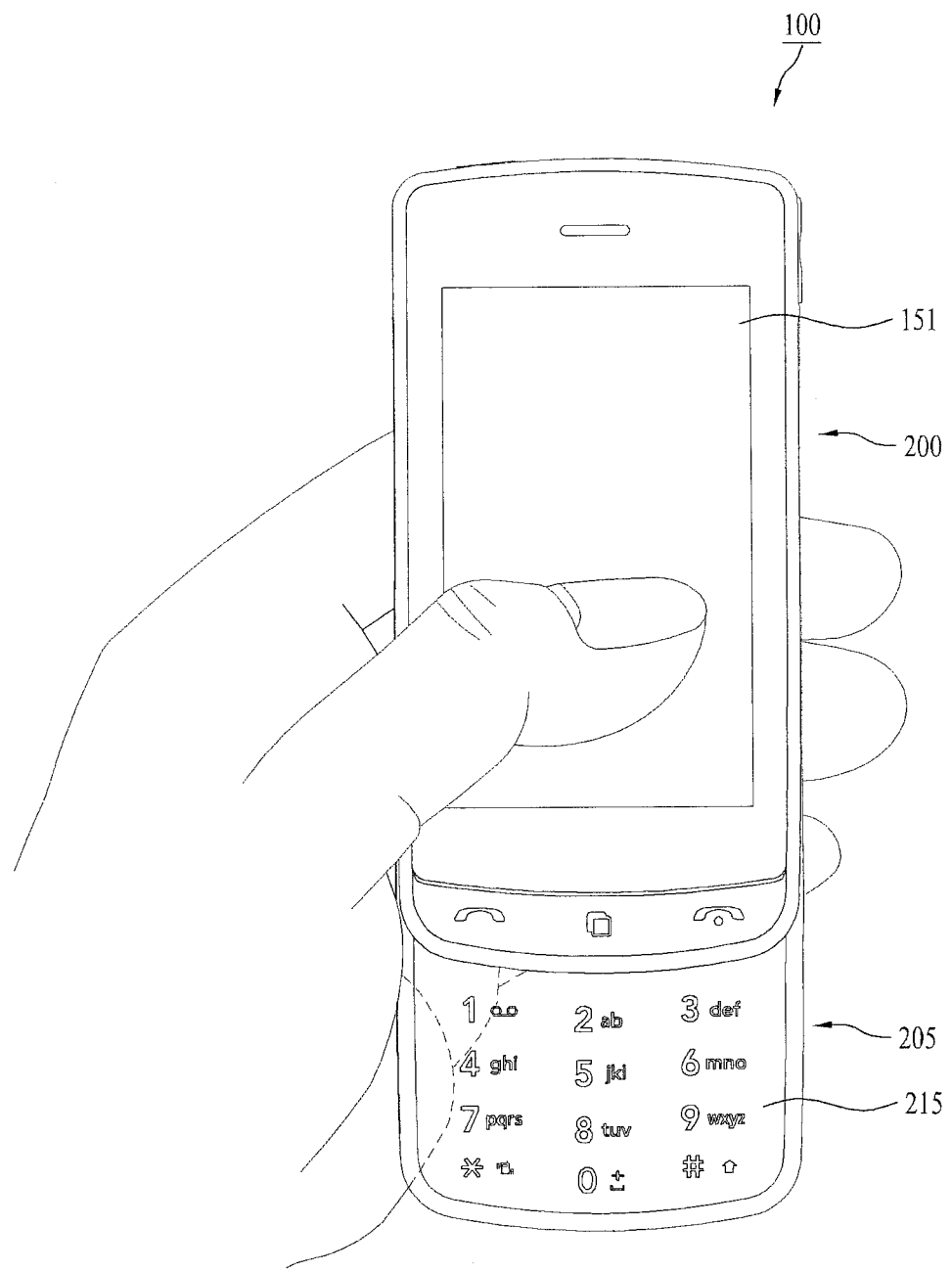
FIGS. 9 and 11 are front views of a slider type mobile terminal provided with a transparent pad according to an embodiment as broadly described herein.
Figure 10A:
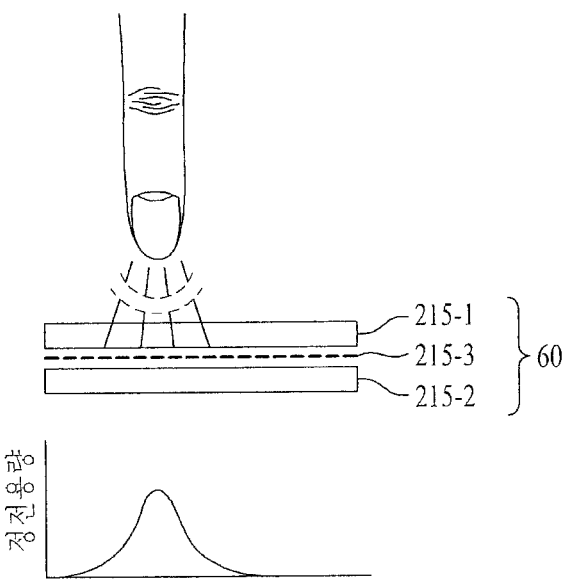
FIG. 10A and FIG. 10B illustrate operational principles of the transparent pad shown in FIG. 9.
Figure 10B:
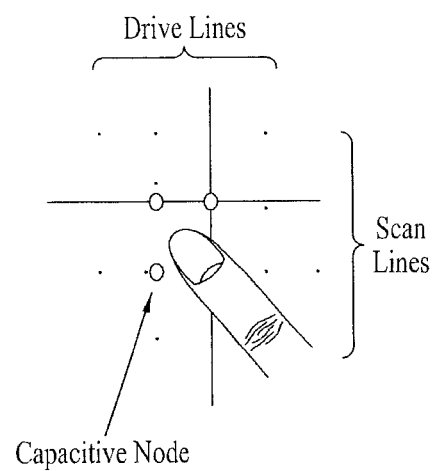
Figure 11:
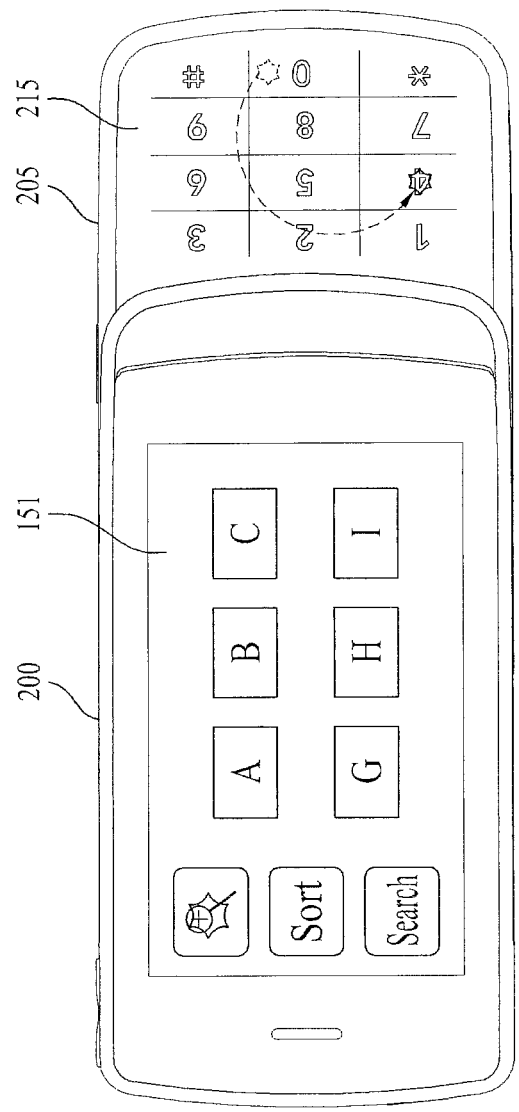

The above-described embodiments may be applied to a slider type mobile terminal 100 as shown in FIGS. 9 to 11. Such a slider type mobile terminal 100 may include a first body 200 having a touchscreen 151 and a second body 205 having a key button type touchpad 215. The first body 200 and the second body 205 may be assembled together to be mutually open/closed by a sliding mechanism. The touchpad 215 may include a transparent pad.

If a prescribed key button on the touchpad 215 is simply touched with a touching/pointing implement (e.g., a finger, a stylus, or other implement as appropriate), a character or numeral corresponding to the touched key button may be input to the mobile terminal 100. Moreover, after the touchpad 215 has been touched with the pointing implement, if the pointing implement is dragged in a prescribed shape (i.e., touch & drag), a command corresponding to the touch & drag may be input to the mobile terminal 100.

The second body 205 may be either partially or fully formed of a transparent material. In particular, a part of the second body 205 corresponding to the touchpad 215 may be formed of a transparent material to allow a user to see an object through the second body 205.

An illumination device may be provided at an edge of the second body (e.g., a bottom end and right and left sides of the second body). Such an illumination device may allow the key buttons to be well seen by a user in that the illumination device emits light upon opening the first body 200 relative to the second body 205.

In certain embodiments, the first and second bodies 200 and 205 may be automatically opened/closed through a key button manipulation of the user input unit 130 or an appropriate touch manipulation on the touchscreen 151. Alternatively, or additionally, the first and second bodies 200 and 205 may be manually opened/closed.

As shown in FIG. 10A, in a transparent pad 60 of the touch pad 215, a transparent sensor grid 215-3 is arranged between a first transparent body 215-1 and a second transparent body 215-2 that are facing each other. The first and second transparent bodies 215-1 and 215-2 may be formed of tempered glass or plastics. Characters and/or numerals may be printed on at least one of the first and second transparent bodies 215-1 and/or 215-2.

Operation of a sensor grid is explained with reference to FIG. 10B. A plurality of drive lines and a plurality of scan lines are arranged as shown in FIG. 10B, and a variance of electrostatic capacitance at an intersection between the two lines at a point where the touchpad 215 is touched is delivered to the controller 180 so that a corresponding signal may be recognized. A timing point of the corresponding operation may be determined based on a moment of recognizing a touch and/or a moment of recognizing a releasing the touch. As mentioned in the foregoing description, owing to the sensing operation of such a sensor grid, an action of performing a rotary touch & drag on a touch wheel 53 may be recognized. A function of a touchpad or mouse used for a notebook computer or the like may be implemented as well as a text input, recognition of a specific finger of a user is possible as well.

Therefore, as mentioned in the foregoing description, the touchpad 215 of the second body 205 may receive a touch & drag input of a prescribed type, and thus the touch wheel 53 may be replaced by the touchpad 215, which may provide similar functionality to the touch wheel 53, in addition to the use of key buttons.

In particular, as shown in FIG. 11, the touchscreen 151 of the first body 200 corresponds to the aforesaid touch unit, and the touchpad 215 of the second body 205 may correspond to the aforesaid second touch unit. Therefore, the above-described mobile terminal controlling method shown in FIGS. 4-8 may also be applicable to the slider type mobile terminal shown in FIGS. 9-11.

Various embodiments may be applicable to the slider type mobile terminal 100 as well as the aforesaid mobile terminal controlling method. These embodiments will be further explained with reference to FIGS. 12 to 24, in which a screen 400 of the touchscreen and the touchpad 215 are shown.

FIGS. 12A-142C illustrate a mobile terminal in the process of menu execution for inputting a text.

As shown in FIG. 12A, a 'simple touch' is performed on key buttons of the touchpad 215 to input corresponding text that is displayed on the touchscreen 400. In this disclosure, 'simple touch' indicates a touch to the touchscreen 400 with a pointer, such as a finger, stylus or other pointing implement as appropriate, without dragging the pointer.

In FIG. 12B, a touch & drag is performed on the touchpad 215 in a prescribed direction. Each time the touch & drag is performed, the inputted text is erased by one alphabetic character, numeral, symbol or word. When the touch & drag is performed, the number of characters or words may be erased in proportion to a length of the touch & drag.

As shown in FIG. 12C, after the touch & drag has been performed on the touchpad 215 in a prescribed direction, the corresponding touch may be maintained for a predetermined period of time without having the pointer released from a position of the pointer. In this case, the number of characters or words are erased in proportion to the touch maintained time.

Figures 13A, 13B:
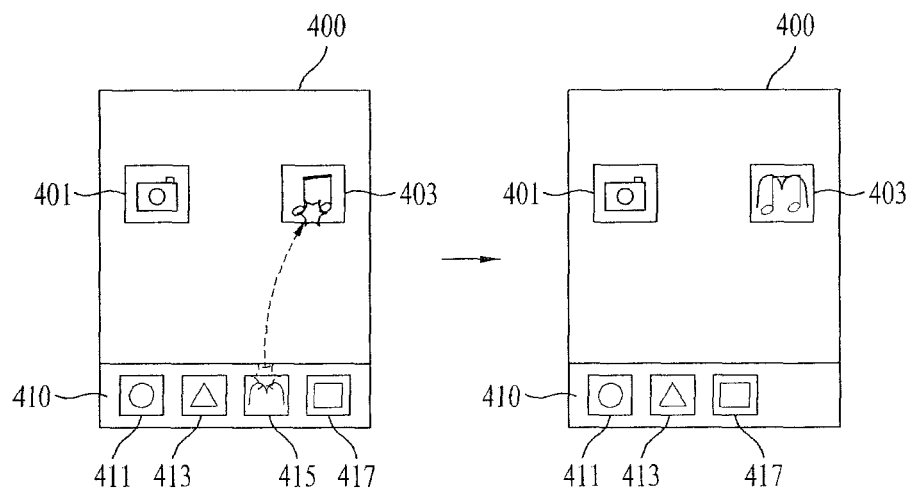

As shown in FIG. 13A, menu icons 401 and 403 are displayed on the touchscreen 400, and icons 411, 413, 415 and 417 corresponding to various touch & drag gestures are displayed in a touch & drag gesture icon region 410 of the touchscreen 400. One of the touch & drag gesture icons 411, 413, 415 and 417 may be selected, touched and then dragged to a prescribed one of the menu icons 401 and 403 to indicate a particular gesture to be performed on a particular menu icon.

In the example shown in FIG. 13B, the selected touch & drag gesture icon 415 disappears from the touch & drag gesture icon region 410, and a gesture shape (i.e., 'M' shape) corresponding to the selected touch & drag gesture icon 415 is displayed in overlay the prescribed menu icon 403 (i.e., an MP3 play menu). This means that the selected touch & drag gesture 415 is to be applied to the prescribed menu icon 403.

Figures 16A, 16B:
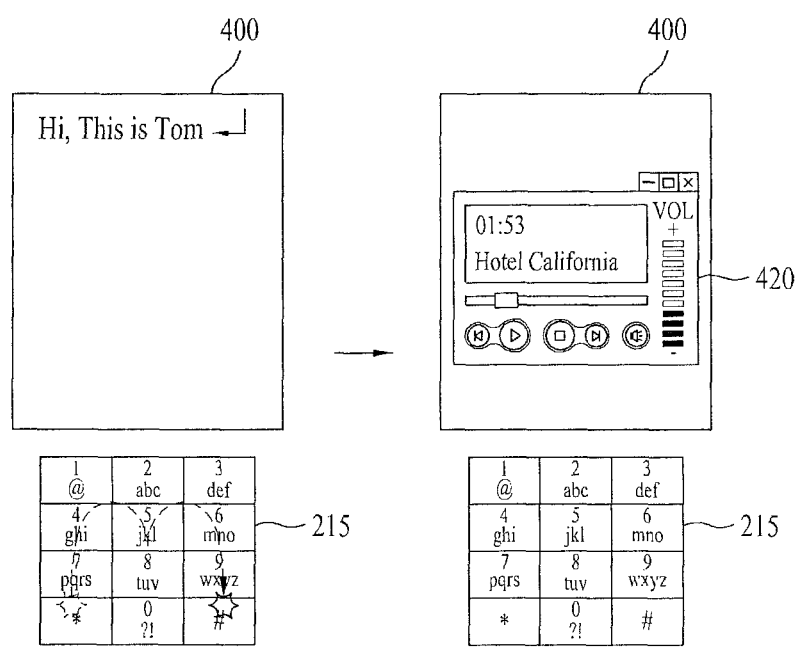

Employment of the touch & drag gesture 415 selected in FIG. 13B is explained in more detail with reference to FIGS. 16A-16B. As shown in FIGS. 16A-16B, if, for example, the mobile terminal 100 is in a standby mode or a menu other than the MP3 play menu is being executed, and the touch & drag corresponding to the M-shape gesture 415 is performed on the touchpad 215 or the touchscreen 400, the MP3 play menu 420 is instantly executed.

Figures 13C, 13D:
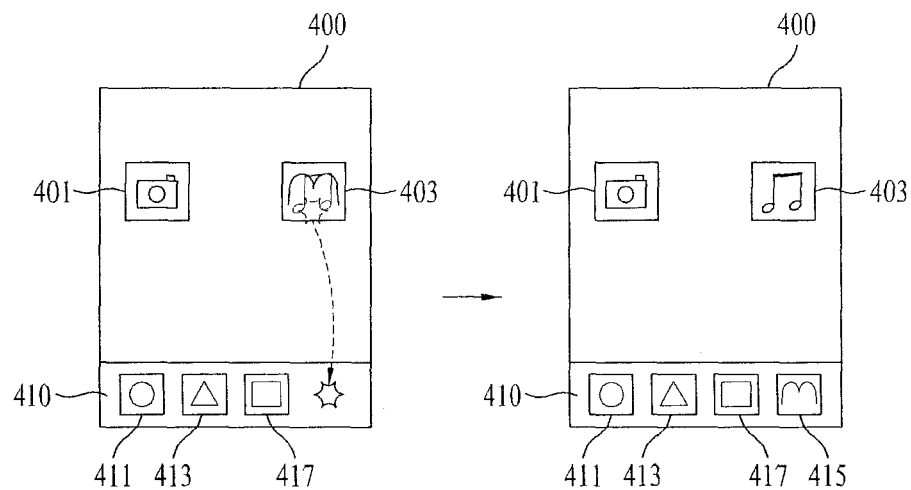

Referring back now to FIG. 13C, after the prescribed menu icon 403 has been touched and the gesture 415 is applied, the gesture 415 is dragged to the touch & drag gesture icon region 410 and, as shown in FIG. 13D, the touch & drag gesture 415 set at the prescribed menu icon 403 is released.

Figure 14A:
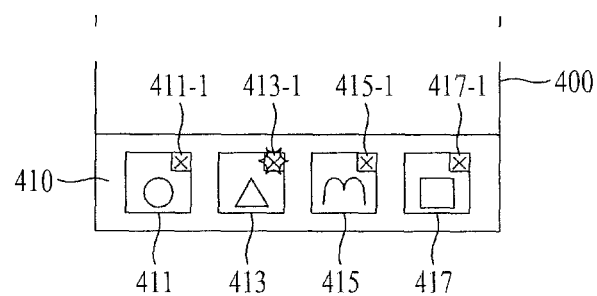
Figure 14B:
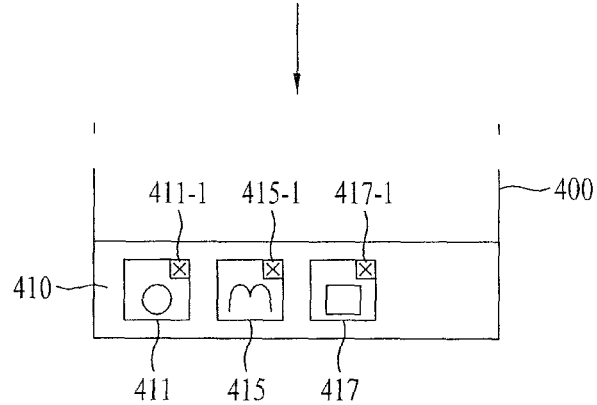

As shown in FIGS. 14A-14B, a menu for deleting one of the touch & drag gesture icons 411, 413, 415 and 417 may be entered by an appropriate manipulation of the user input unit 130 of the mobile terminal 100. For example, as shown in FIG. 14A, delete indicators 411-1, 411-3, 415-1 and 417-1 may be respectively provided with each of the touch & drag gesture icons 411, 413, 415 and 417. As shown in FIG. 14B, if, for example, the delete indicator 413-1 is selected, the touch & drag gesture icon 413 corresponding to the selected delete indicator 413-1 disappears from the touch & drag gesture icon region 410.

As shown in FIGS. 15A-15C, a menu for generating a touch & drag gesture icon may be entered by an appropriate manipulation of the user input unit 130 of the mobile terminal 100. For example, as shown in FIG. 15A, a touch & drag is performed on the keypad 215 according to a prescribed gesture and, a picture corresponding to the prescribed gesture is displayed on the touchscreen 400. Subsequently, as shown in FIG. 15B, the picture corresponding to the prescribed gesture is dragged from the touchscreen 400 to the touch & drag gesture icon region 410. The touch & drag gesture icon 415 corresponding to the prescribed gesture is then generated and displayed the touch & drag gesture icon region 410, as shown in FIG. 15C.

Figure 17A:
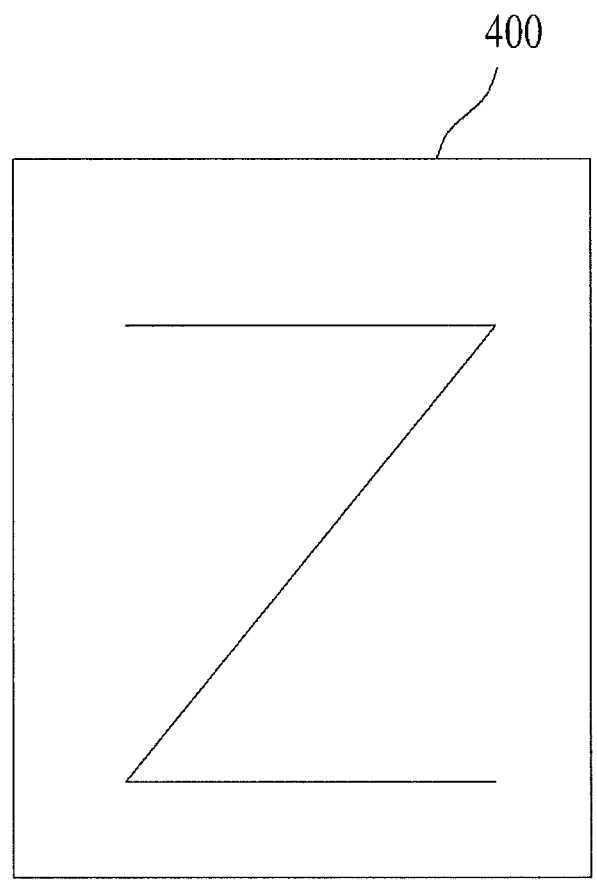
Figure 17B:
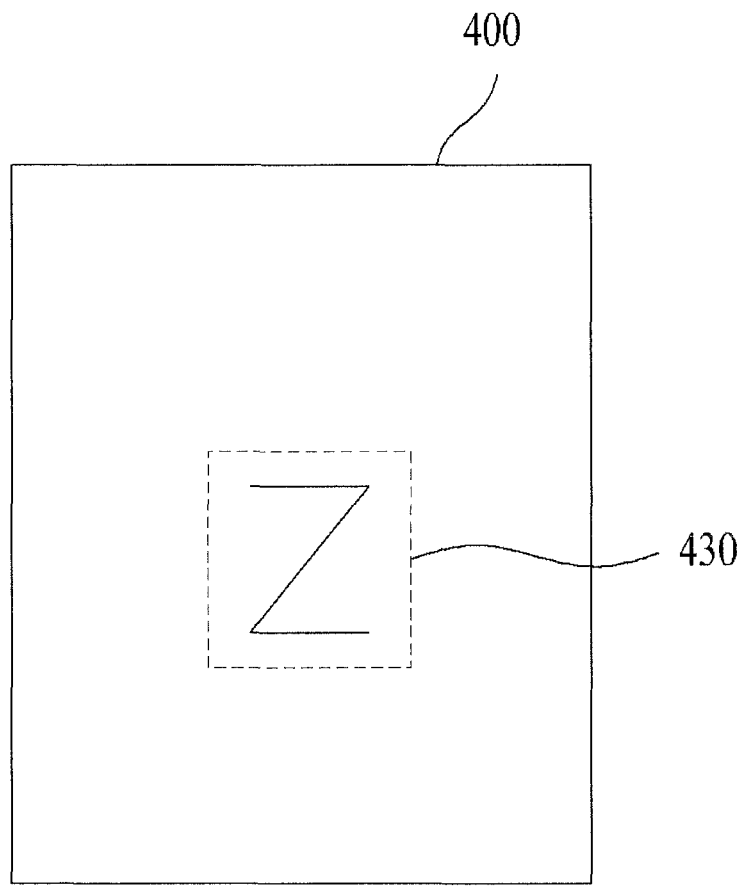
Figure 17C:
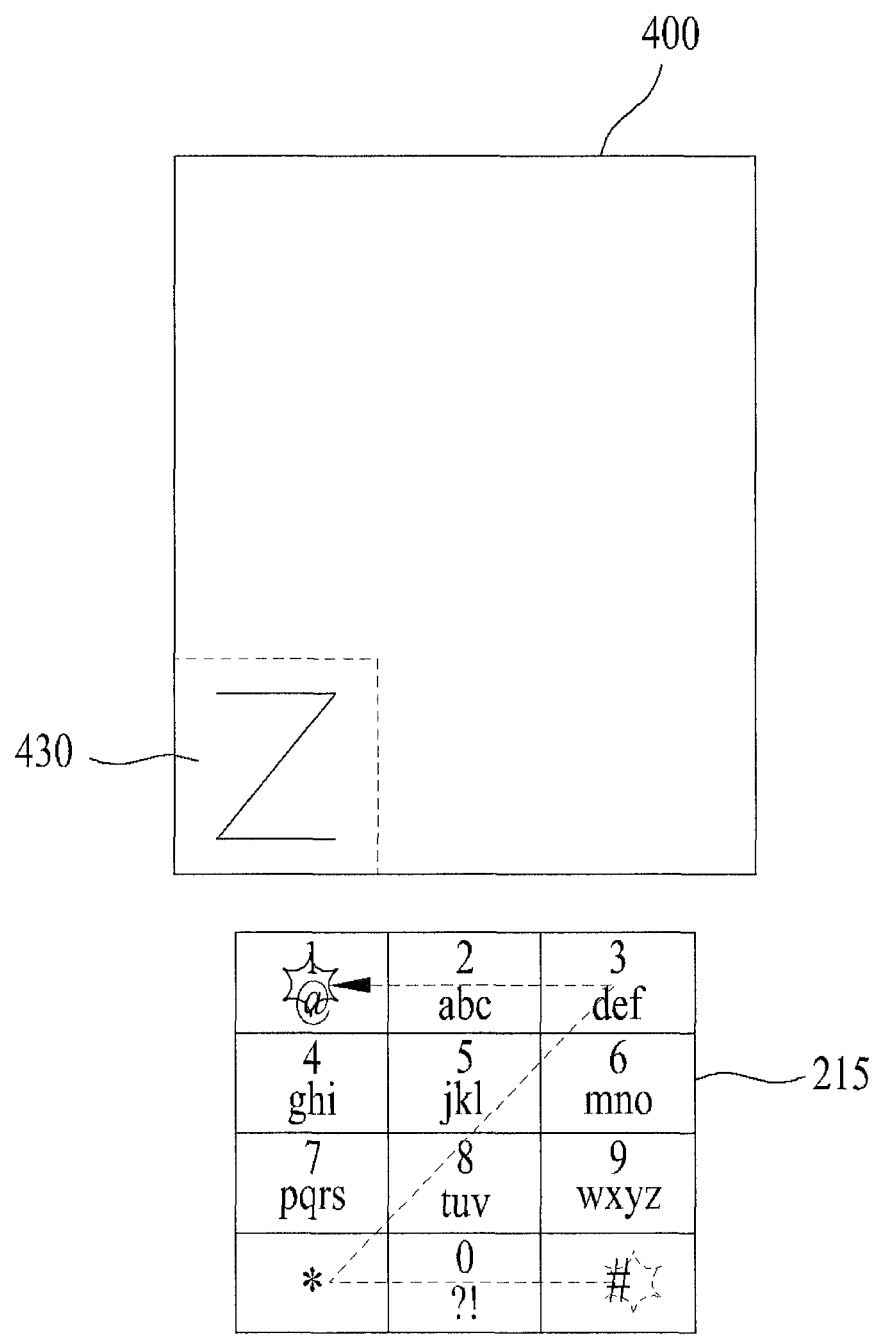

FIGS. 17A-17C illustrates execution of a picture draw menu or a text handwriting input menu of the mobile terminal 100. Referring to FIG. 17A, a touch & drag is performed on the touchpad 215 in a prescribed shape (e.g., a Z shape). In this example, the touch & drag is performed in a manner that the prescribed shape occupies approximately 90% of an area of the touchpad 215. A picture corresponding to the prescribed shape may be displayed on the touchscreen 400, and may also occupy approximately 90% of a size of the touchscreen 400. In certain embodiments, a ratio of a size of the prescribed shape of the touch & drag to a size of the touchpad 215 may be approximately equal to a ratio of a size of the picture of the prescribed shape to a size of the touchscreen 400.

Referring to FIG. 17B, a touch & drag may be performed on the touchpad 215 in a prescribed shape (e.g., a Z shape). In this example, the prescribed shape occupies approximately 90% of a size of the touchpad 215. In this example, a picture 430 corresponding to the prescribed shape may be displayed on the touchscreen 400 to occupy approximately 20% of a central part of the touchscreen 400.

Alternatively, as shown in FIG. 17C, a picture 430 corresponding to the prescribed shape may be displayed on the touchscreen 400 to occupy approximately 20% of an edge or corner part of the touchscreen 400. In this example, a ratio of a size of the picture 430 of the prescribed shape to a size of the touchscreen 400 may be less than a ratio of a size of the prescribed shape of the touch & drag to a size of the touchpad 215.

Figure 18A:
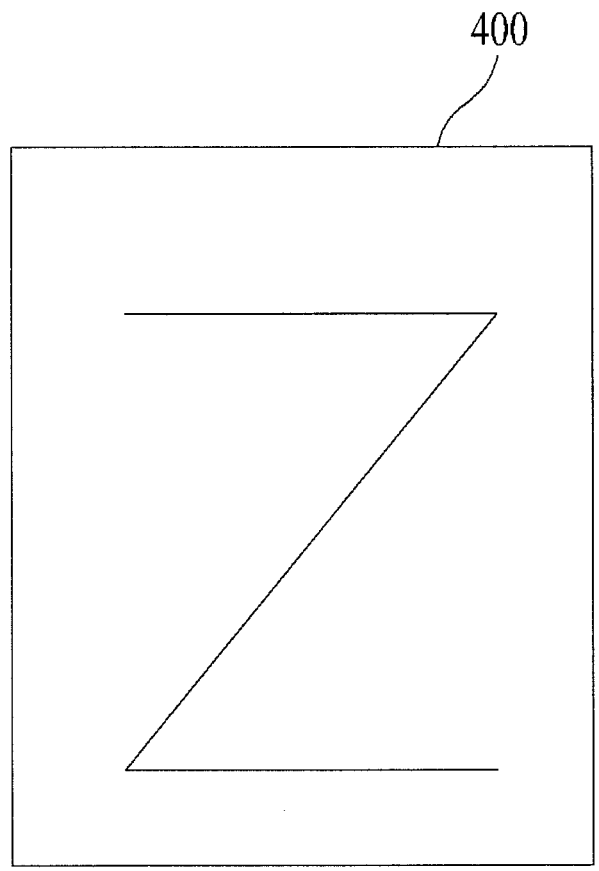
Figure 18B:
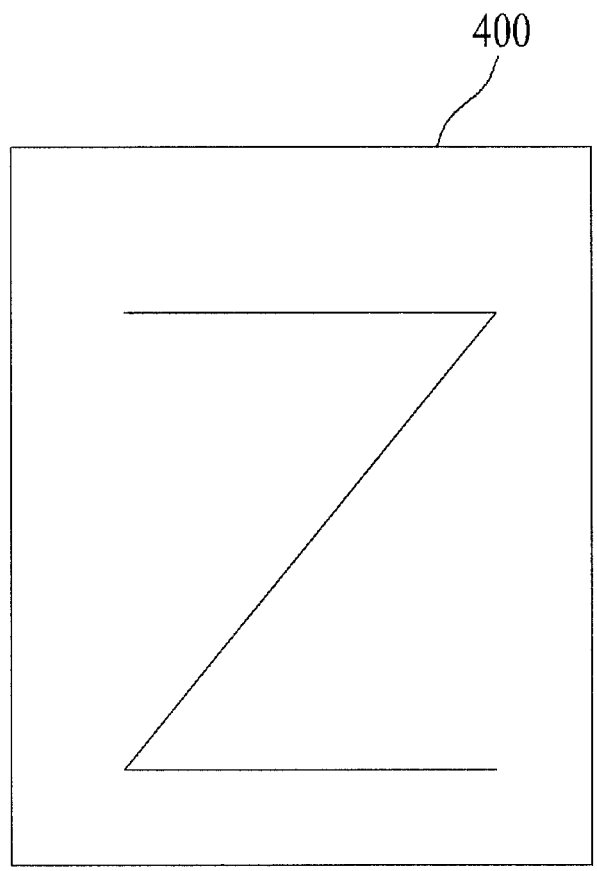

As shown in FIG. 18A, a touch & drag may be performed on the touchpad 215 so as to form a prescribed shape (e.g., a Z shape). In this example, the touch & drag may be performed at a central part of the touchpad 215 such that an area 215-1 of the prescribed shape occupies approximately 20% of a size of the touchpad 215. In this example, a picture corresponding to the prescribed shape may be drawn on the touchscreen 400 to occupy approximately 90% of the touchscreen 400. Referring to FIG. 18B, a touch & drag may be performed at an edge or corner part of the touchpad 215 such that an area 215-1 of the prescribed shape occupies approximately 20% of a size of the touchpad 215. In this example, a picture corresponding to the prescribed shape may be drawn on the touchscreen 400 to occupy approximately 90% of the touchscreen 400. In particular, a ratio of a size of the picture of the prescribed shape to a size of the touchscreen 400 may be greater than a ratio of a size of the prescribed shape of the touch & drag to a size of the touchpad 215.

Figure 18C:
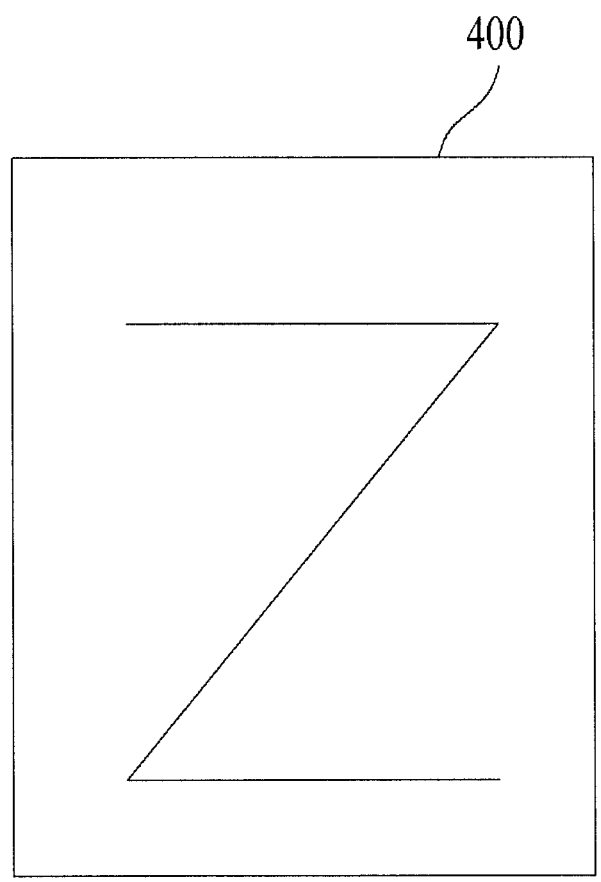

Referring to FIG. 18C, a ratio of width to length of the touchscreen 400 may be different from a ratio of width to length of the touchpad 215. In this case, when a touch & drag is performed on the touchpad 215 to form a prescribed shape, the prescribed shape may be drawn on the touchscreen 400 such that a width to length ratio of the prescribed shape touched and dragged on the touchpad 215 is converted to fit the width to length ratio of the touchscreen 400.

Figure 19B:
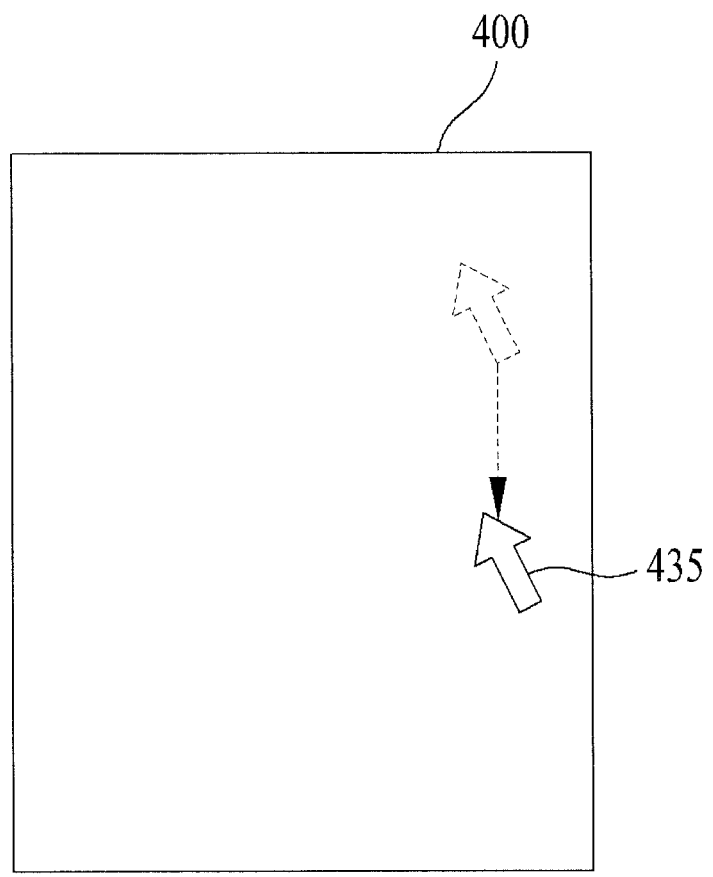

In FIGS. 19A-19B, the mobile terminal 100 is executing a menu for displaying a cursor 435 on the touchscreen 400. As shown in FIG. 19A, a touch & drag 1 or a touch & drag 2 may be performed on the touchpad 215. In this example, the touch & drag 1 and the touch & drag 2 differ from each other in start position but have substantially the same length and direction. Referring to FIG. 19B, each of the touch & drag 1 or the touch & drag 2 shifts the cursor 435 along the same trace. In this example, only the direction and length of a touch & drag performed on the touchpad 215 for shifting the cursor 435 affects the trace of the cursor 435, while a start position of the touch & drag does not affect the trace of the cursor 435.

Figure 20A:
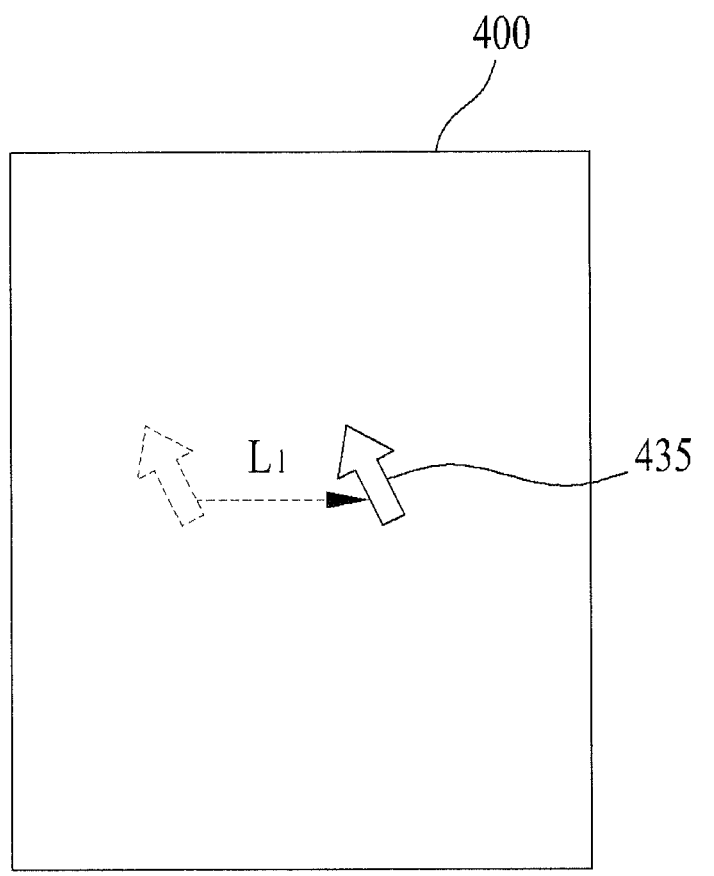
Figure 20B:
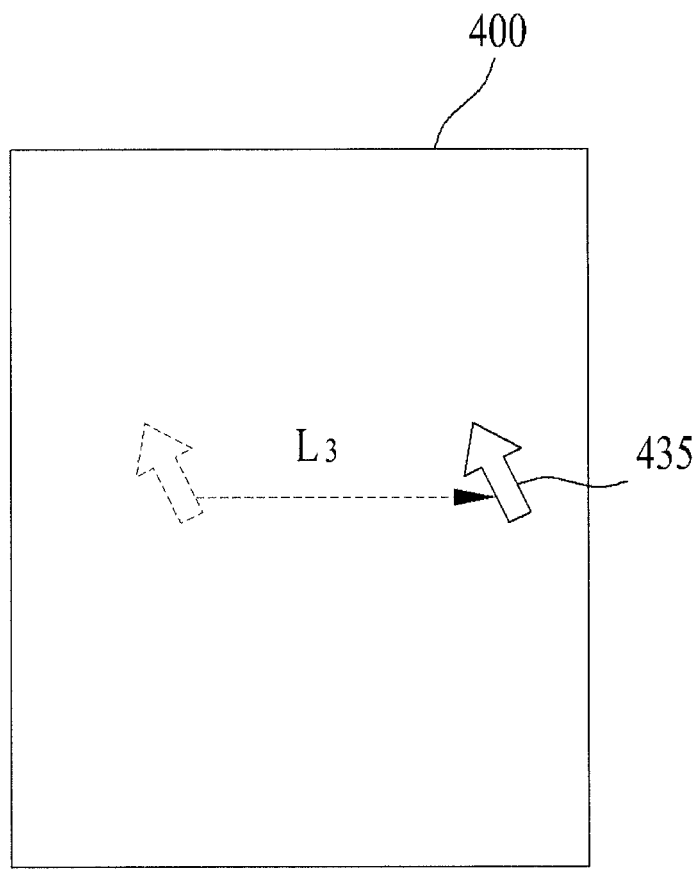

In FIGS. 20A-20B, the mobile terminal 100 is executing a menu for displaying a cursor 435 on the touchscreen 400. Referring to FIG. 20A, when a touch & drag is performed on the touchpad 215 along a first length L1 and at a first speed V1, the cursor 435 is shifted to a second length L2 on the touchscreen 400. As shown in FIG. 20B, when a touch & drag is performed on the touchpad 215 along the first length L1 and at a second speed V2 than the first speed V1, the cursor 435 is shifted a third length L3 which is greater than the second length L2 on the touchscreen 400. In particular, a speed of the touch & drag on the touchpad 215 affects a shift distance of the cursor 435 on the touchscreen 400.

Figure 21C:
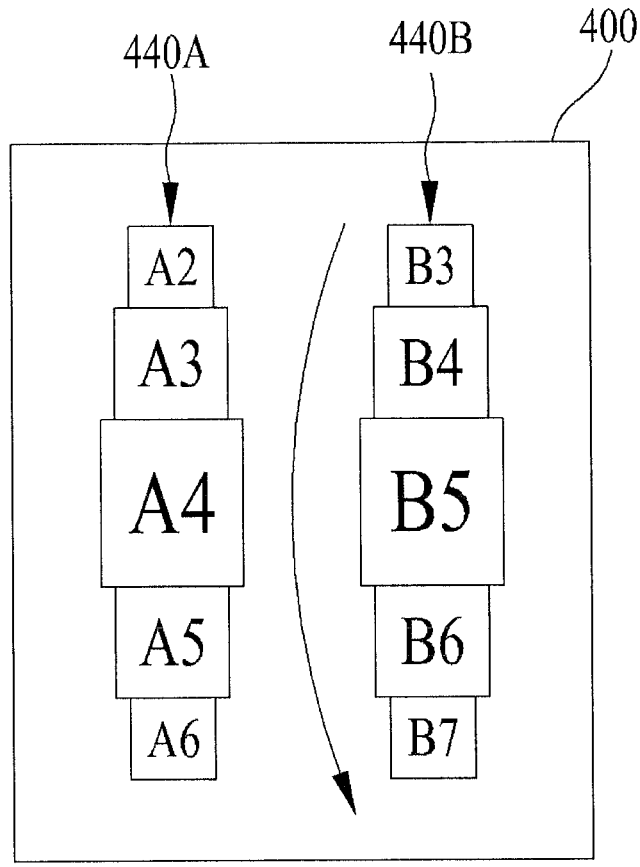

In FIGS. 21A-21C the mobile terminal 100 is executing a menu for displaying various objects (e.g., photos, videos, etc.) as thumbnails. Referring to FIG. 21A, objects A1-A5 of a first group 440A are displayed on a left part of the touchscreen 400 in a cascade or waterfall shape. Objects B4-B8 of a second group 440B are displayed on a right part of the touchscreen 400 in a cascade or waterfall shape. The touchpad 215 may be divided into a left region 215A to control the objects A1-A5 of the first group 440A, and a right region 215B to control the objects B4-B8 of the second group 440B. In FIG. 21A, a touch & drag is performed on the left region 215A, from bottom to top.

In response to the touch and drag shown in FIG. 21A, the objects of the first group 440A are rotated, or scrolled, bottom to top, while maintaining the waterfall shape, as shown in FIG. 21B. A touch & drag is performed on the right region 215B, from top to bottom and, the objects of the second group 440B are rotated, or scrolled top to bottom, while maintaining the waterfall shape as shown in FIG. 21C.

Figure 22A:
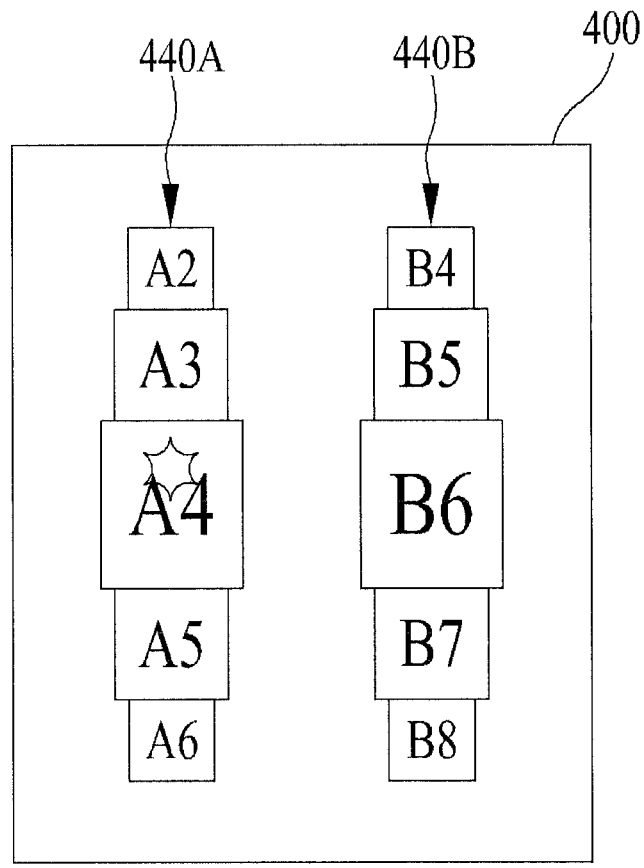
Figure 22B:
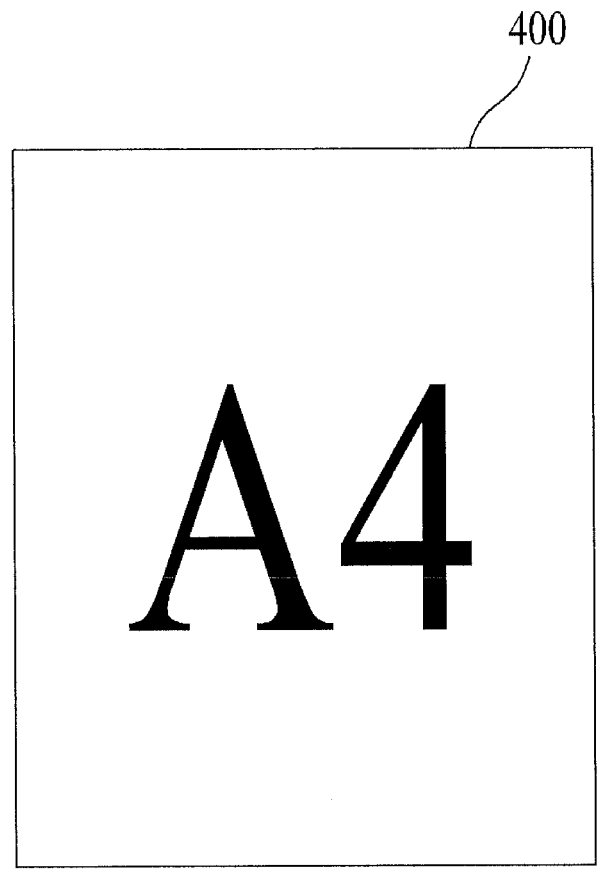

As shown in FIG. 22A, a random point of the left region 215A is touched. Alternatively, an object A4 (hereinafter referred to as the 'front most object') arranged in a front position among the objects of the first group 440A displayed on the touchscreen 400 may be touched. In response to either of these touches, the touches front most object A4 of the first group 440A is executed, as shown in FIG. 22B. If a different object (for example, object A5) other than the front most object A4 is touched on the touchscreen 400, the object A5 may instead be executed if desired.

Figure 22C:
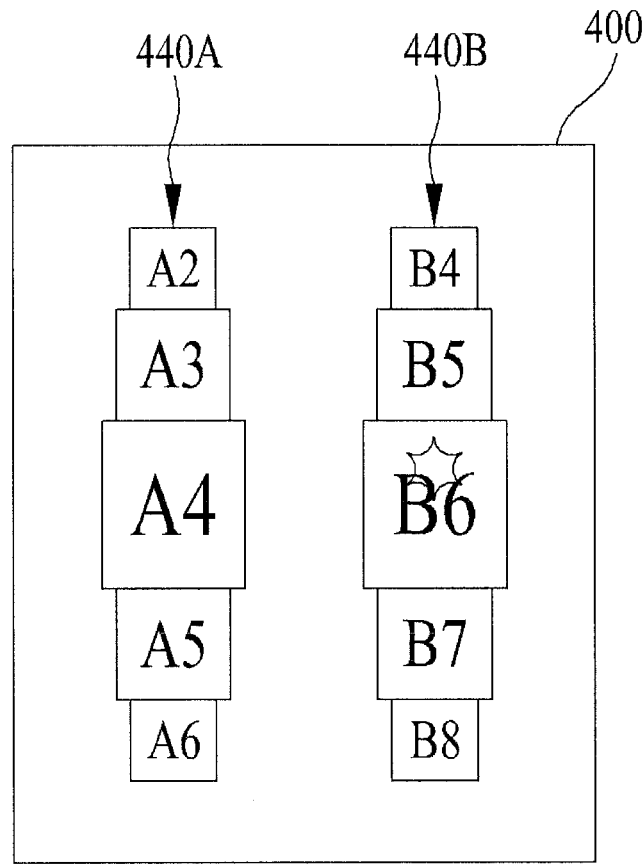
Figure 22D:
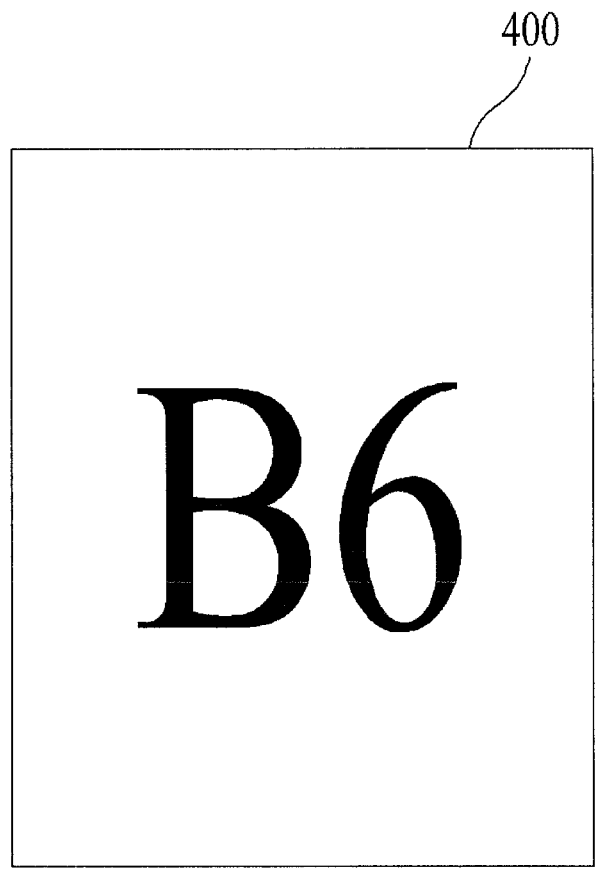

Referring to FIG. 22C, a random point of the right region 215B may be touched or a front most object B6 arranged at a front most position among the objects of the second group 440B displayed on the touchscreen 400 may be touched. In response to either of these touches, referring to FIG. 22D, the front most object B6 of the second group 440B may be executed.

Figure 23B:
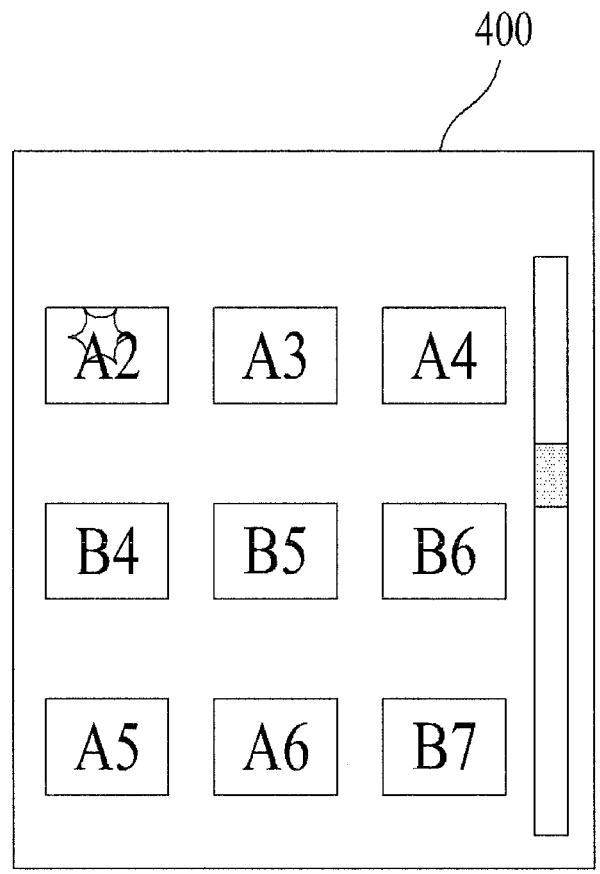
Figure 23C:
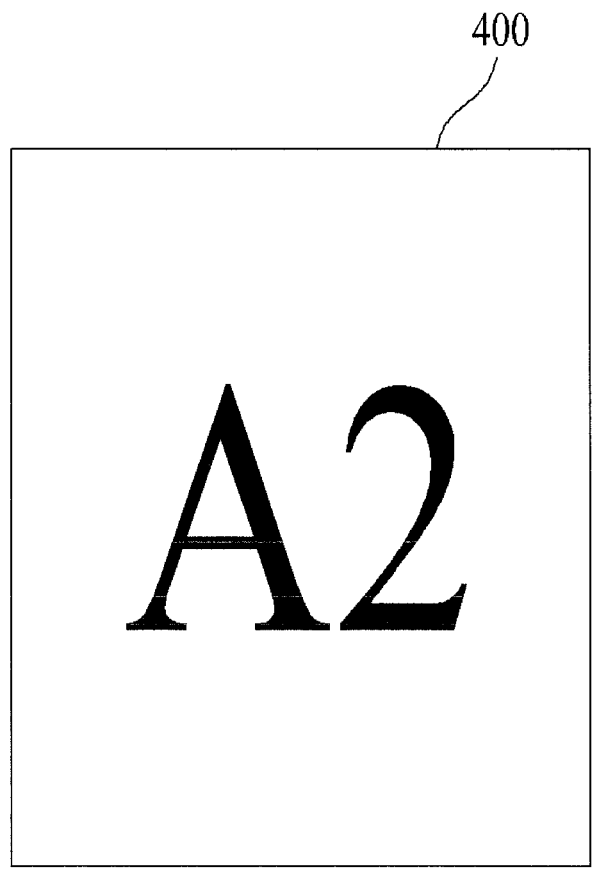

In FIGS. 23A-23C, the mobile terminal 100 is executing a menu for displaying various objects (for example, photos, videos, etc.) as thumbnails. Referring to FIG. 23A, objects A1-A4 and B2-B6 are displayed on the touchscreen 400, and touch & drag is performed on the touchpad 215 from bottom to top. In response to this touch and drag, referring to FIG. 23B, the objects are scrolled top to bottom on the touchscreen 400, and then a prescribed one of the objects A2 is touched. The prescribed/touched object A2 is then executed, as shown in FIG. 23C.

Figure 24A:
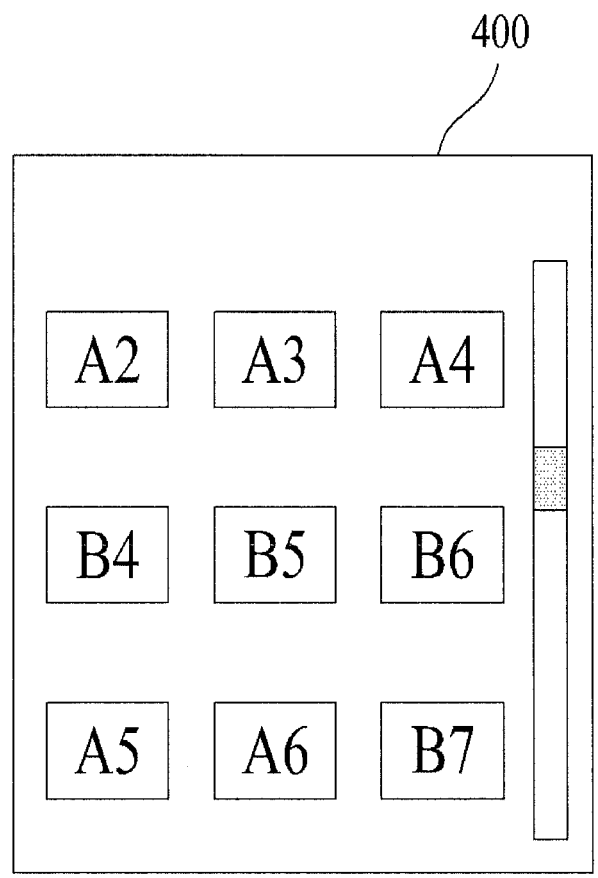
Figure 24B:
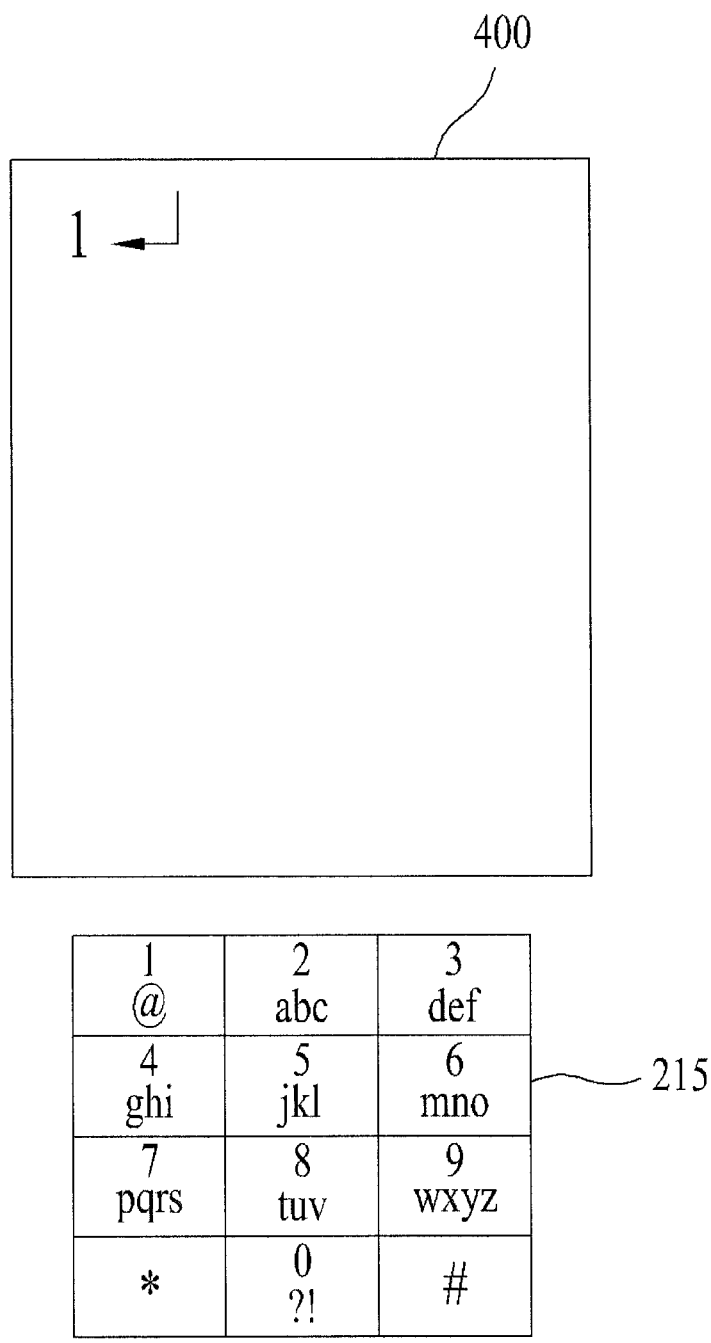

In FIGS. 24A-24B, the mobile terminal 100 is executing a menu for displaying various objects (for example, photos, videos, etc.) as thumbnails. Referring to FIG. 24A, objects A2-A6 and B4-B7 are displayed on the touchscreen 400, and key button of the touchpad 215 is touched. As shown in FIG. 24B, a numeral or character corresponding to the touched key button is then displayed on the touchscreen 400. The displayed numeral or character may be utilized for dialing, message writing or other functions as appropriate.

In a system and method as embodied and broadly described herein, even if a minimum number of menu icons for executing diverse functions are displayed on a touchscreen, a prescribed one of the diverse functions may be easily selected and executed.

In a system and method as embodied and broadly described herein, a setting of a touch gesture to be used for a function icon for executing main menus (and not sub menus) in a mobile terminal may be implemented.

A system and method as embodied and broadly described herein may be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like, and may also include carrier-wave type implementations (e.g., transmission via Internet). The computer may include the controller 180 of the terminal.

A mobile terminal and controlling method thereof is provided in which, even if a minimum number of menu icons for executing diverse functions are displayed on a touchscreen, a prescribed function may be easily selected from the diverse functions displayed on the touchscreen.

A mobile terminal as embodied and broadly described herein may include a first touch unit including a touchscreen configured to display at least one or more menu items, a second touch unit configured to receive an input of a rotary touch & drag, and a controller configured to recognize the rotary touch & drag inputted to the second touch unit as a different command according to whether one of the at least one or more menu items is touched.

A method of controlling a mobile terminal as embodied and broadly described herein may include displaying at least one or more menu items on a first touch unit including a touchscreen, and recognizing a rotary touch & drag inputted to the second touch unit as a different command according to whether one of the at least one or more menu items is touched.

A mobile terminal in accordance with another embodiment as broadly described herein may include a display configured to display images according to a first coordinate, a touch input device configured to provide an input signal according to a second coordinate, and a controller configured to execute at least one of mapping the second coordinate to the first coordinate by at least one of magnifying the second coordinate, reducing the second coordinate, shifting the second coordinate, changing a moving distance or a moving velocity of the second coordinate, and changing an axial ratio of the second coordinate.

A method of controlling a mobile terminal in accordance with another embodiment as broadly described herein may include displaying images according to a first coordinate and upon receiving an input signal according to a second coordinate, executing at least one of mapping the second coordinate to the first coordinate by at least one of magnifying the second coordinate, reducing the second coordinate, shifting the second coordinate, changing a moving distance or a moving velocity of the second coordinate, and changing an axial ratio of the second coordinate.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a touchscreen configured to receive a touch input and display a content;
a sub-touch device configured to receive a touch & drag input; and
a controller configured to:
recognize the touch input received at the touchscreen and the sub-touch device,
when the touch input is received via the touchscreen, control menu items associated with the content to be displayed on the touchscreen, and
when the touch & drag input is received via the sub-touch device while one of menu items on the touchscreen is selected by the touch input received via the touchscreen, control at least one submenu item subordinated to the menu item selected by the touch input to be displayed on the touchscreen in response to the touch & drag input, wherein when the menu item selected by the touch input is related to a function to change a storing folder of the content, the at least one submenu item corresponds to at least one candidate folder to which the content is able to be moved, wherein when a secret folder is selected from among the at least one candidate folder, the controller is configured to move the content to the secret folder and stop displaying the content on the touchscreen after the movement, and wherein when a non-secret folder is selected from among the at least one candidate folder, the controller is configured to move the content to the non-secret folder and keep displaying the content on the touchscreen, wherein when both of another touch input on the touchscreen and another touch & drag input on the sub-touch device are detected simultaneously, the controller is further configured to change a submenu item in response to the another touch & drag input, the submenu item being subordinate to the menu item selected by the another touch input on the touchscreen, and wherein when one of the another touch input on the touchscreen or the another touch & drag input on the sub-touch device is released while the other is maintained, the controller is further configured to execute a command corresponding to the submenu item selected at the time of releasing the one of the another touch input or the another touch & drag input.

2. The mobile terminal of claim 1, wherein the controller highlights the selected submenu item when the touch & drag input is received while one of the menu items is selected by the touch input.

3. The mobile terminal of claim 1, further comprising:
a sub-display configured to display an indicator indicating a selected submenu item from among the at least one submenu, wherein the sub-display is provided within the sub-touch device.

4. The mobile terminal of claim 1, the sub-touch device comprising:
a first transparent body;
a second transparent body; and
a transparent sensor grid positioned between the first and second transparent bodies, wherein at least one of a character or a numeral is on at least one of the first transparent body or the second transparent body.

5. The mobile terminal of claim 4, wherein a plurality of characters and numerals are on the at least one of the first transparent body or the second transparent body so as to define key buttons of a touchpad that activate the sensor grid in response to corresponding single point touches, wherein the sensor grid is also configured to receive a touch and drag input.

6. The mobile terminal of claim 1, further comprising:
a first body; and
a second body slidably coupled to the first body by a sliding mechanism, wherein the first and second bodies are configured to be opened/closed relative to each other by the sliding mechanism, wherein the touchscreen is provided in the first body and the sub-touch device is provided in the second body, and wherein the second body is transparent.

7. The mobile terminal of claim 6, further comprising an illumination device provided at an edge of the second body such that when the first and second bodies are in an open position relative to each other, the controller controls the illumination device to emit light.

8. The mobile terminal of claim 1, wherein the controller is configured to execute a prescribed operation in response to a touch gesture of a prescribed type performed on the sub-touch device.

9. The mobile terminal of claim 1, wherein the sub-touch device is configured to receive both a simple touch input corresponding to a prescribed character or numeral and a touch gesture corresponding to a prescribed operation.

10. A method of controlling a mobile terminal, the method comprising:
displaying a content on a touchscreen;
displaying one or more menu items on a touchscreen associated with the content when a touch input is received via the touchscreen;
receiving the touch input selecting one of the menu items displayed on the touchscreen;
displaying at least one submenu item subordinated to the menu item when a touch & drag input is received via a sub-touch device,
wherein when the menu item selected by the touch input is related to a function to change a storing folder of the content, the at least one submenu item corresponds to at least one candidate folder to which the content is able to be moved,
wherein when a secret folder is selected from among the at least one candidate folder, the content is moved to the secret folder and the content is stopped from being displayed on the touchscreen after the movement, and
wherein when a non-secret folder is selected from among the at least one candidate folder, the content is moved to the non-secret folder and the content is kept from being displaying on the touchscreen after the movement,
wherein in response to both of another touch input on the touchscreen and another touch & drag input on the sub-device are detected simultaneously, changing a submenu item in response to the another touch & drag input, the submenu item being subordinate to the menu item selected by the another touch input on the touchscreen, and
wherein in response to one of the another touch input on the touchscreen or the another touch & drag input on the sub-device is released while the other is maintained, executing a command corresponding to the submenu item selected at the time of releasing the one of the another touch input or the another touch & drag input.

11. The method of claim 10, further comprising:
highlighting the selected submenu item when the touch & drag input is received while one of the menu items is selected by the touch input.

* * * * *